(12) United States Patent
Ueda et al.

(10) Patent No.: US 7,353,645 B2
(45) Date of Patent: *Apr. 8, 2008

(54) MATERIAL FOR GLAND PACKING AND THE GLAND PACKING

(75) Inventors: Takahisa Ueda, Osaka (JP); Masaru Fujiwara, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 46 days.

This patent is subject to a terminal disclaimer.

(21) Appl. No.: 10/527,626

(22) PCT Filed: Sep. 9, 2003

(86) PCT No.: PCT/JP03/11502

§ 371 (c)(1),
(2), (4) Date: Mar. 10, 2005

(87) PCT Pub. No.: WO2004/025149

PCT Pub. Date: Mar. 25, 2004

(65) Prior Publication Data

US 2005/0238862 A1    Oct. 27, 2005

(30) Foreign Application Priority Data

Sep. 11, 2002  (JP)  ............... 2002-265881
Sep. 11, 2002  (JP)  ............... 2002-265882
Sep. 11, 2002  (JP)  ............... 2002-265988

(51) Int. Cl.
*D02G 3/02* (2006.01)

(52) U.S. Cl. ....................... 57/235; 57/260

(58) Field of Classification Search .......... 57/210, 57/212, 229, 235, 260
See application file for complete search history.

(56) References Cited

U.S. PATENT DOCUMENTS

| 4,559,862 | A | * | 12/1985 | Case et al. ............ 87/1 |
| 5,370,405 | A | * | 12/1994 | Ueda .................. 277/537 |
| 5,549,306 | A | * | 8/1996 | Ueda .................. 277/537 |
| 5,605,341 | A | * | 2/1997 | Ueda .................. 277/536 |

(Continued)

FOREIGN PATENT DOCUMENTS

EP    1 179 698    2/2002

(Continued)

*Primary Examiner*—Jill Gray
(74) *Attorney, Agent, or Firm*—William L. Androlia; H. Henry Koda

(57) ABSTRACT

A reinforcing member made from a fibrous material and disposed at least on one face of a strip-like expanded graphite to form a strip-like base member. The base member is stranded to be formed as a cord-like member. At this time, one side end edge of the base member is placed on the outer peripheral surface of the cord-like member, and, in the side end edge, the strip-like expanded graphite is more elongated in the width direction than the reinforcing member. The stranding of the base member is applied while the strip-like expanded graphite which is elongated in the width direction is placed on the inner side, and the reinforcing member which is short in the width direction is placed on the outer side. According to the configuration, both the reinforcing member and the strip-like expanded graphite are placed in a spiral manner to be alternately arranged in the axial direction on the outer peripheral surface of the cord-like member.

13 Claims, 30 Drawing Sheets

U.S. PATENT DOCUMENTS

| | | | | |
|---|---|---|---|---|
| 5,803,464 | A * | 9/1998 | Ueda et al. | 277/528 |
| 6,082,739 | A * | 7/2000 | Ueda et al. | 277/539 |
| 6,502,382 | B1 * | 1/2003 | Fujiwara et al. | 57/200 |
| 6,601,377 | B2 * | 8/2003 | Tsukamoto | 57/200 |
| 6,644,007 | B2 * | 11/2003 | Fujiwara et al. | 57/210 |
| 7,140,171 | B2 * | 11/2006 | Ueda et al. | 57/235 |
| 7,155,892 | B2 * | 1/2007 | Ueda et al. | 57/235 |
| 2003/0070413 | A1 * | 4/2003 | Fujiwara et al. | 57/210 |
| 2005/0218604 | A1 * | 10/2005 | Shimizu et al. | 277/537 |
| 2005/0238862 | A1 * | 10/2005 | Ueda et al. | 428/292.1 |
| 2006/0010849 | A1 * | 1/2006 | Ueda et al. | 57/210 |
| 2006/0026944 | A1 * | 2/2006 | Ueda et al. | 57/210 |

FOREIGN PATENT DOCUMENTS

| | | |
|---|---|---|
| GB | 2 285 067 | 6/1995 |
| JP | 3-249482 | 11/1991 |
| JP | 10-132086 | 5/1998 |
| WO | WO 01/48403 | 7/2001 |

* cited by examiner

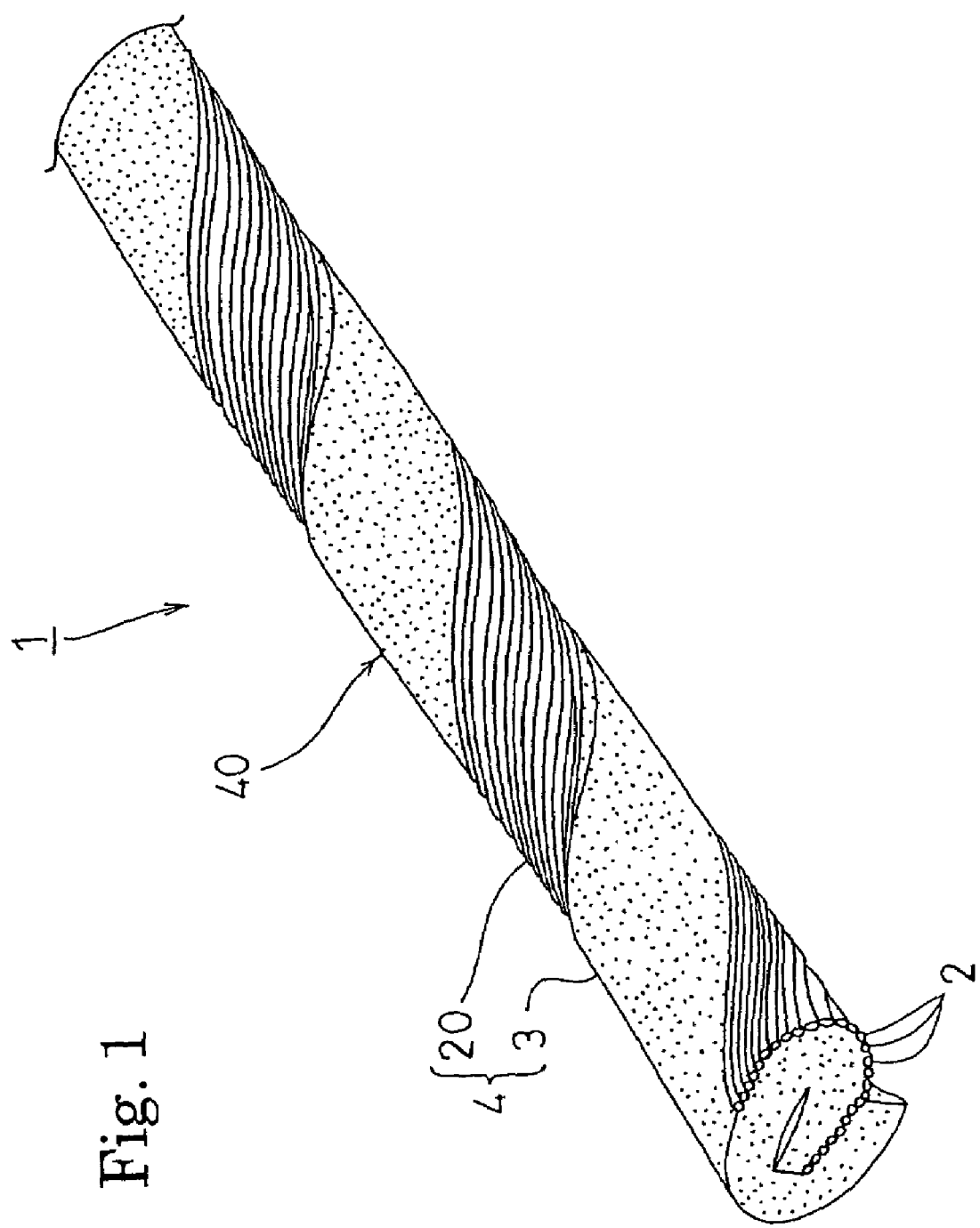

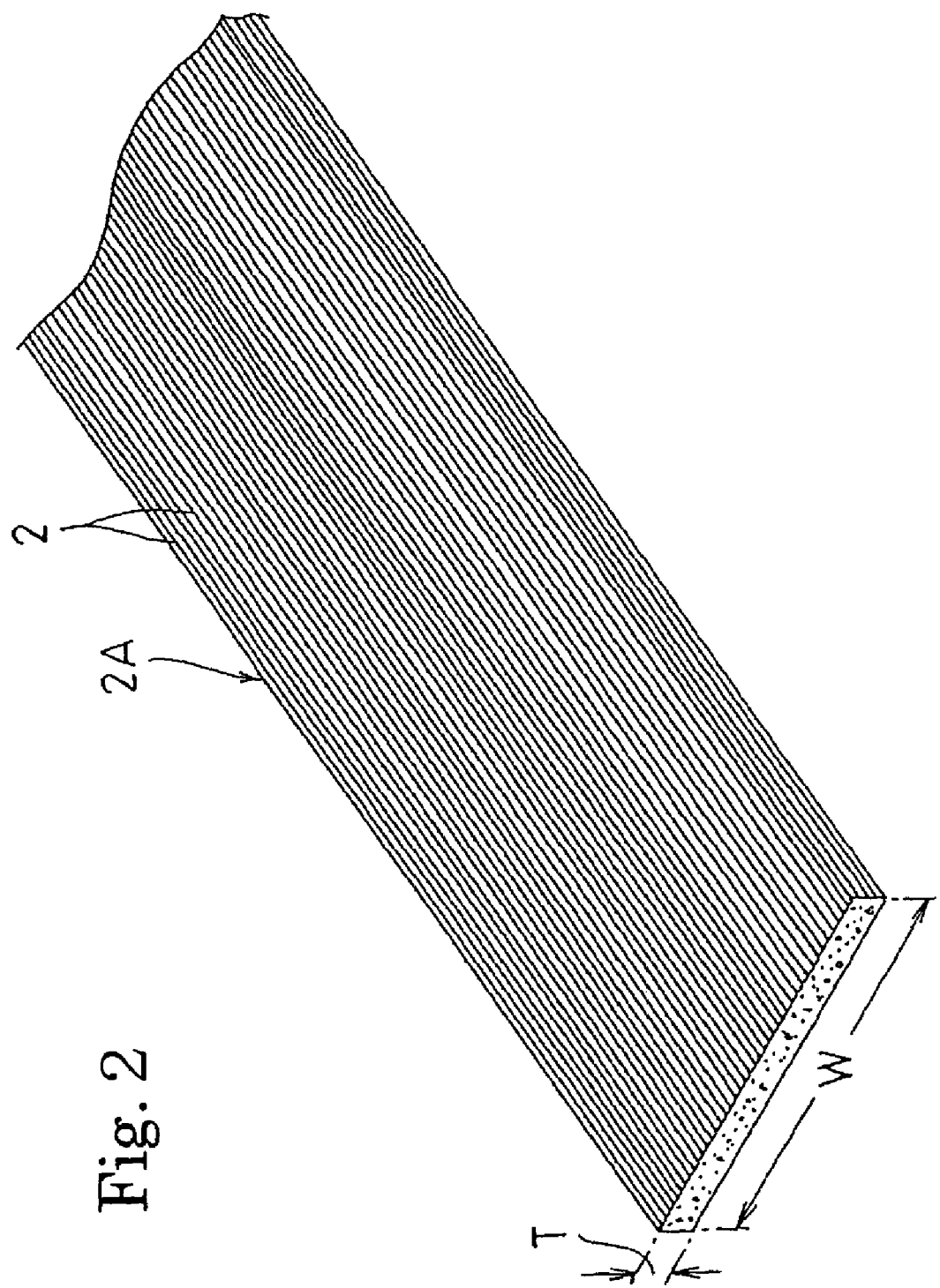

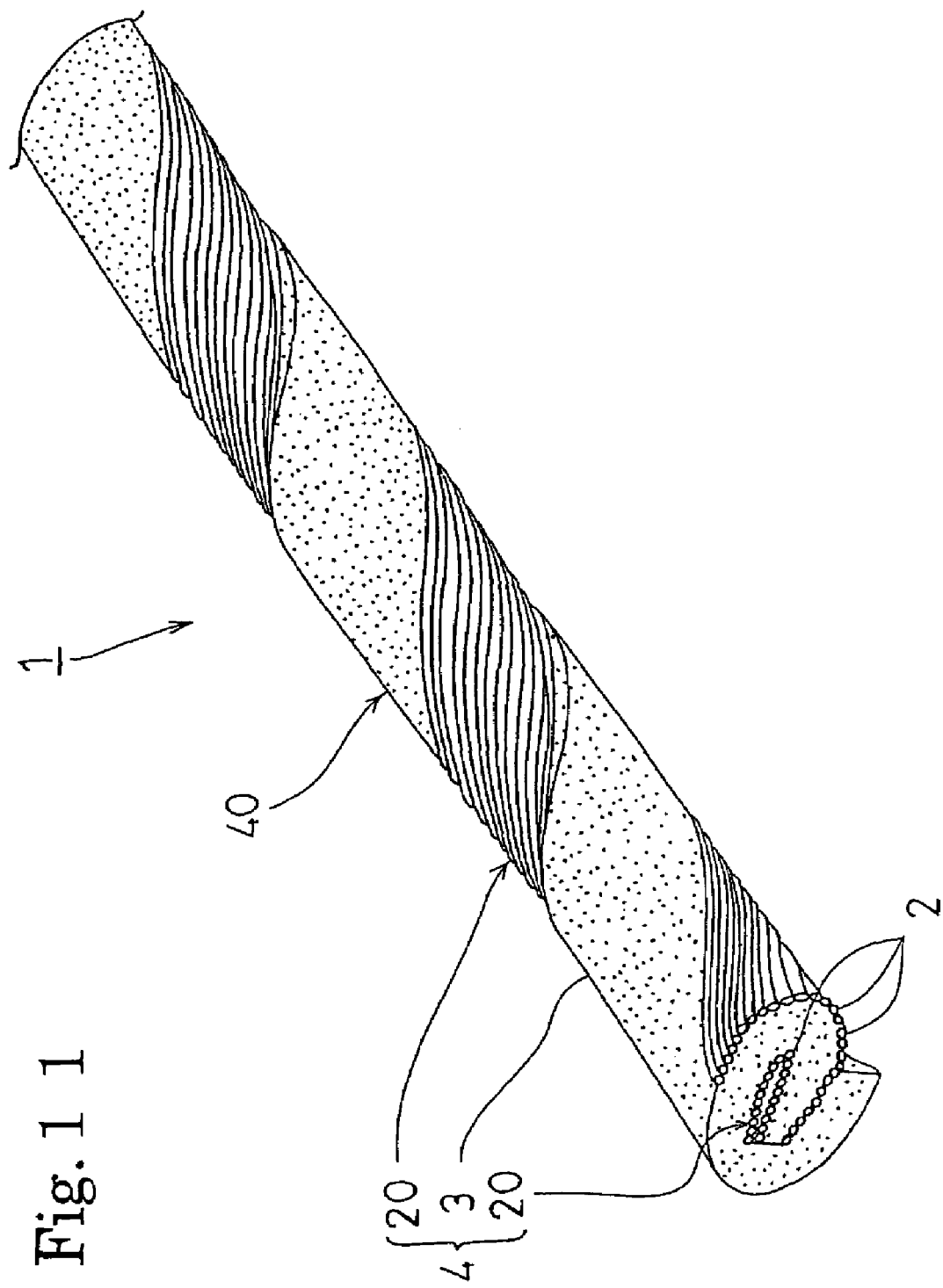

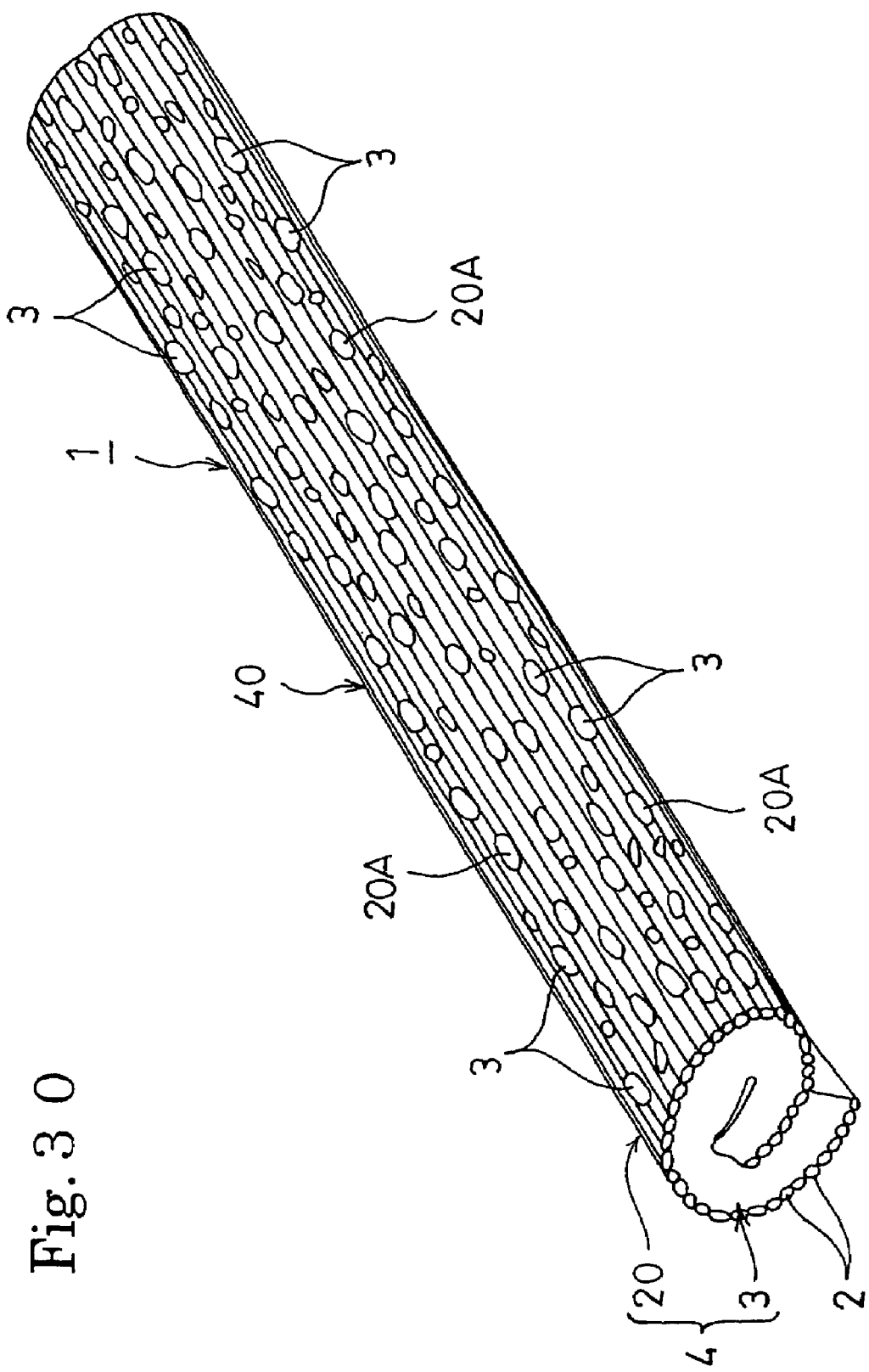

MATERIAL FOR GLAND PACKING AND THE GLAND PACKING

TECHNICAL FIELD

The present invention relates to a gland packing material which is useful in production of a gland packing, and also to a gland packing which is produced by the gland packing material.

BACKGROUND ART

Conventionally, as a gland packing material which is useful in production of a gland packing, for example, known are a material disclosed in Japanese Patent Publication No. 6-27546 (hereinafter, referred to as conventional art 1), and that disclosed in Japanese Patent No. 2,583,176 (hereinafter, referred to as conventional art 2).

In conventional art 1 above, as shown in FIG. 35, for example, tape-like expanded graphite (51) is folded along longitudinal fold lines to form a cord-like member (52), and the cord-like member (52) is covered by a reinforcing member (53) configured by a knitted or braided member of metal wires such as stainless steel, inconel, or monel, thereby forming a gland packing material (50).

In conventional art 2 above, as shown in FIG. 36, for example, a cord-like member (52) of tape-like expanded graphite (51) is covered by a reinforcing member (53) configured by a knitted or braided member of metal wires, and the resulting member is folded to a V-like shape along a longitudinal fold line, thereby forming a gland packing material (50).

In both the gland packing materials (50) of the conventional art, the outside of the cord-like member (52) is reinforced by the reinforcing member (53) configured by a knitted or braided member of metal wires (hereinafter, such reinforcement is referred to as external reinforcement) Therefore, the gland packing materials (50) are provided with high tensile strength. Consequently, a plurality of such gland packing materials (50) are bundled, and then subjected to a braiding or twisting process, so that a gland packing can be produced. In conventional art 1 above, when eight gland packing materials (50) are bundled and an eight-strand square-knitting process is conducted, for example, a gland packing (54) which is braided as shown in FIG. 37 is produced, and, when six gland packing materials (50) are bundled and a twisting process is conducted, a gland packing (54) which is twisted as shown in FIG. 38 is produced. In conventional art 2 above, when eight gland packing materials (50) are bundled and an eight-strand square-knitting process is conducted, for example, a gland packing (54) which is braided as shown in FIG. 39 is produced, and, when six gland packing materials (50) are bundled and a twisting process is conducted, a gland packing (54) which is twisted as shown in FIG. 40 is produced.

Each of the conventional gland packings (54) is provided by the expanded graphite (51) with properties which are preferable in sealing, and which are inevitable in a packing, such as the heat resistance, the compressibility, and the recovery property, and hence can seal a shaft seal part of a fluid apparatus while producing a high sealing property.

On the other hand, as a further gland packing material which is useful in production of a gland packing, for example, known is a material disclosed in Japanese Patent No. 3,101,916 (hereinafter, referred to as conventional art 3).

In conventional art 3, as shown in FIG. 41, for example, both faces of a reinforcing member (53) configured by plural carbon fibers are covered by expanded graphite (51), thereby forming a gland packing material (50) in which the interior is reinforced (hereinafter, such reinforcement is referred to as internal reinforcement).

The gland packing material (50) is provided with high tensile strength by the reinforcing member (53) configured by the carbon fibers, and hence can be subjected to a braiding or twisting process. When a plurality of such gland packing materials (50) are bundled, and then a braiding or twisting process is applied to the bundle, therefore, a gland packing can be produced. When eight gland packing materials (50) are bundled and an eight-strand square-knitting process is conducted, for example, a gland packing (54) which is braided as shown in FIG. 37 is produced, and, when six gland packing materials (50) are bundled and a twisting process is applied, a gland packing (54) which is twisted as shown in FIG. 38 is produced.

Each of the conventional gland packings (54) is provided by the expanded graphite (51) with properties which are preferable in sealing, and which are inevitable in a packing, such as the compressibility and the recovery property, and hence can seal a shaft seal part of a fluid apparatus while producing a high sealing property.

In the gland packing material (50) having the external reinforcement structure disclosed in conventional art 1 or 2, however, the cord-like member (52) of the expanded graphite (51) is covered by the reinforcing member (53). Therefore, the gland packing material can obtain an excellent shape-retaining property, but has a drawback that the sealing property is poor. By contrast, in the gland packing material (50) having the internal reinforcement structure disclosed in conventional art 3, the surface of the reinforcing member (53) is covered by the expanded graphite (51). Therefore, the gland packing material can obtain an excellent sealing property, but has a drawback that the shape-retaining property is poor. In the gland packing (54) which is produced by bundling a plurality of the gland packing materials (50) having the poor sealing property and then applying a braiding or twisting process to the bundle, it is not expected to exert a high sealing property. In the gland packing (54) which is produced by bundling a plurality of gland packing materials (50) having the poor shape-retaining property and then applying a braiding or twisting process to the bundle, there is a possibility that the expanded graphite (51) drops off during the braiding or the twisting process, the elasticity of the gland packing (54) is reduced, the properties which are preferable in sealing, such as the compressibility and the recovery property are lost, and the sealing property of the gland packing (54) is lowered.

The invention has been developed in view of the above-described circumstances. It is an object of the invention to provide a gland packing material which is provided with high tensile strength by a reinforcing member to be easily subjected to a braiding or twisting process, and which has both an excellent shape-retaining property that is possessed by a gland packing material having the external reinforcement structure, and an excellent sealing property that is possessed by a gland packing material having the internal reinforcement structure, and a gland packing which is produced with using the gland packing material.

DISCLOSURE OF THE INVENTION

In order to attain the object, for example, the invention is configured in the manner which will be described with reference to FIGS. 1 to 34 showing embodiments of the invention.

Namely, the invention relates also to a gland packing material, and is characterized in that the material is configured by a cord-like member (40) which is formed by stranding a strip-like base member (4), or winding a strip-like base member (4) about a longitudinal direction, or winding a strip-like base member (4) about a longitudinal direction and then stranding the base member, the base member (4) comprises: a reinforcing member (20) configured by a fibrous material (2); and a strip-like expanded graphite (3), the reinforcing member (20) is disposed at least on one face of the strip-like expanded graphite (3), and both the reinforcing member (20) and the strip-like expanded graphite (3) are placed on an outer peripheral surface of the cord-like member (40).

The invention relates to a gland packing, and is characterized in that a plurality of the gland packings (1) are used, and braided or twisted.

According to the configuration, the invention has the following advantages.

The cord-like member is surely reinforced by the reinforcing member configured by the fibrous material. The strip-like expanded graphite has properties which are preferable in sealing, and which are inevitable in a packing, such as the heat resistance, the compressibility, and the recovery property. Since the reinforcing member and the strip-like expanded graphite are placed on the outer peripheral surface of the cord-like member, an excellent shape-retaining property can be ensured by the reinforcing member, and an excellent sealing property can be ensured by the strip-like expanded graphite. Therefore, the gland packing material can satisfactorily exert both the functions of the shape-retaining property and the sealing property.

Consequently, in the gland packing which is produced with using a plurality of the gland packing materials, the expanded graphite is prevented from dropping off during the braiding or the twisting process, the elasticity is not reduced, and the properties which are preferable in sealing, such as the compressibility and the recovery property can be held. In the case where the packing is compressed or a pressure is applied to the packing, movement of expanded graphite particles is suppressed. Therefore, the sealing face pressure is prevented from being lowered, so that the pressure resistance performance can be improved, and the pressure contact force to be applied to the counter member is kept to a high level, so that the sealing property can be improved. As a result, the gland packing can satisfactorily seal a shaft seal part of a fluid apparatus or the like.

For example, the gland packing material in which both the reinforcing member and the strip-like expanded graphite are placed on the outer peripheral surface of the cord-like member can be configured in the following manner.

One side end edge of the base member is placed on an outer peripheral surface of the cord-like member. In the side end edge, one of the reinforcing member and the strip-like expanded graphite is more elongated in a width direction than another member. While the one member which is elongated in the width direction is placed on an inner side, and the other member which is short in the width direction is placed on an outer side, the base member is stranded, or the base member is stranded after the base member is wound about the longitudinal direction. As a result, the reinforcing member and the strip-like expanded graphite are placed in a spiral manner to be alternately arranged in an axial direction on the outer peripheral surface of the cord-like member.

Alternatively, the gland packing material may be configured in the following manner.

The reinforcing member is formed to be smaller in width than the strip-like expanded graphite, and a plurality of the reinforcing members are disposed at least on one face of the strip-like expanded graphite with forming intervals therebetween in the width direction. While the small-width reinforcing members are placed on an outer side, the base member is stranded, or the base member is stranded after the base member is wound about the longitudinal direction. As a result, the reinforcing members and the strip-like expanded graphite are placed in a spiral manner to be alternately arranged in an axial direction on the outer peripheral surface of the cord-like member.

Alternatively, the gland packing material may be configured in the following manner.

The base member is stranded about an intermediate portion in a width direction of the base member, or the base member is stranded after the base member is wound about the longitudinal direction in an intermediate portion in the width direction of the base member, thereby causing both side end edges of the base member to be positioned on an outer peripheral surface of the cord-like member. In one of the side end edges, the reinforcing member is placed on an outer side, and, in another side end edge, the strip-like expanded graphite is placed on an outer side. As a result, the reinforcing member and the strip-like expanded graphite are placed in a spiral manner to be alternately arranged in an axial direction on the outer peripheral surface of the cord-like member.

Alternatively, the gland packing material may be configured in the following manner.

The reinforcing member is placed on the outer peripheral surface of the cord-like member. A large number of openings are formed in the reinforcing member. The strip-like expanded graphite enters the openings, and is exposed from the outer peripheral surface of the cord-like member through the openings. As a result, the outer peripheral surface of the cord-like member has a mixed structure of the reinforcing member and the strip-like expanded graphite in which the strip-like expanded graphite is randomly dispersed in the reinforcing member.

The reinforcing member may be disposed only on one face of the strip-like expanded graphite, or may be disposed on both faces of the strip-like expanded graphite. In the case where the reinforcing member is disposed on both the faces of the strip-like expanded graphite, an involved amount of the reinforcing members which are involved in the cord-like member is increased, and the cord-like member can be strongly reinforced also from the inner side. Therefore, the tensile strength of the gland packing material is further enhanced.

Usually, the fibrous material is formed into a sheet-like shape. For example, the fibrous material sheet may be configured by a fiber-opened sheet in which multifilament yarns are opened in a sheet-like shape.

In this case, a thickness of the fiber-opened sheet is preferably set to 10 μm to 300 μm, and more preferably to 30 μm to 100 μm. According to the configuration, the fiber-opened sheet can be easily produced, and the sheet can be easily stranded, so that the external reinforcement effect can be enhanced, and leakage from a reinforcing member portion can be prevented from occurring.

As the fibrous material, one or two or more selected from the group consisting of carbon fibers and other brittle fibers, and tough fibers may be used. These fibrous materials exert a higher sealing property as the thickness of one fiber is smaller. When each fiber is excessively thin, the fibrous material may be broken during a stranding process, and, when each fiber is excessively thick, the fibrous material is hardly stranded. Therefore, the diameter of each fiber is preferably 3 μm to 15 μm, and more preferably in a range of 5 μm to 9 μm.

In the case where carbon fibers or brittle fibers are used as the fibrous material, as compared with a case where metal wires are used, there is no fear that the gland packing forms a large scratch on a counter member, and the sliding resistance is so low that the rotation performance or axial sliding performance of the counter member can be improved, and an excellent heat resistance can be attained. In the case where carbon fibers are used, particularly, these performances can be exerted more satisfactorily. In the case where other brittle fibers are used, the invention can be economically implemented.

Specific examples of the brittle fibers are glass fibers, silica fibers, and ceramic fibers such as alumina and alumina-silica. One or two or more selected from the group consisting of these fibers can be used.

In the case where tough fibers are used as the fibrous material, the fibrous material can be easily produced with using thin fibers because the fibers have high bendability and exert excellent workability. An economical gland packing material can be provided because the fibers have high productivity. When such a gland packing material is used, not only a gland packing having a large diameter, but also a gland packing having a small diameter can be easily produced, and moreover it is possible to produce a gland packing which has high durability, and which is economical.

Furthermore, specific examples of the tough fibers are metal fibers, aramid fibers, and PBO (poly-p-phenylenebenzobisoxazole) fibers. One or two or more selected from the group consisting of these fibers can be used.

BRIEF DESCRIPTION OF THE DRAWINGS

FIGS. 1 to 21 show embodiments of the invention.

FIGS. 1 to 4 show a first embodiment of the gland packing material of the invention, FIG. 1 is a perspective view of the gland packing material, FIG. 2 is a perspective view showing a fiber bundle, FIG. 3 is a perspective view showing a fiber-opened sheet, and FIG. 4 is a perspective view of a base member.

FIG. 5 is a perspective view of strip-like expanded graphite in a state where a small amount of adhesive agent is used, and showing a modification of a procedure of producing the base member.

FIGS. 6 and 7 show another modification of the procedure of producing the base member, FIG. 6 is a section view showing a first step of the procedure of forming the base member, and FIG. 7 is a section view showing a second step of the procedure of forming the base member.

FIGS. 8 to 13 show modifications of the first embodiment, FIG. 8 is a section view of a base member in a first modification, FIG. 9 is a section view of a base member in a second modification, FIG. 10 is a section view of a base member in a third modification, FIG. 11 is a perspective view of a gland packing material in the third modification, FIG. 12 is a section view of a base member in a fourth modification, and FIG. 13 is a section view of a base member in a fifth modification.

FIGS. 14 to 16 show a second embodiment of the gland packing material of the invention, FIG. 14 is a perspective view of the gland packing material, FIG. 15 is a perspective view showing a reinforcing member, and FIG. 16 is a perspective view of a base member.

FIG. 17 is a perspective view of strip-like expanded graphite in a state where a small amount of adhesive agent is used, and showing a modification of a procedure of producing the base member in the second embodiment.

FIGS. 18 to 20 show modifications of the second embodiment, FIG. 18 is a section view of a base member in a first modification, FIG. 19 is a perspective view of a gland packing material in the first modification, and FIG. 20 is a section view of a base member in a second modification.

FIGS. 21 and 22 show a third embodiment of the gland packing material of the invention, FIG. 21 is a perspective view of the gland packing material, and FIG. 22 is a perspective view of a base member.

FIG. 23 is a section view of a base member in a first modification, and FIG. 24 is a section view of a base member in a second modification.

FIG. 25 is a perspective view of the gland packing material, FIG. 26 is a partial enlarged plan view showing a state where strip-like expanded graphite enters many openings of a reinforcing member, FIG. 27 is a section view taken along the line A-A in FIG. 26, FIG. 28 is a section view showing a first step of a procedure of shaping a base member, and FIG. 29 is a section view showing a second step of the procedure of shaping the base member.

FIGS. 30 to 32 show modifications of the fourth embodiment, FIG. 30 is a perspective view of a gland packing material in a first modification, FIG. 31 is a section view of a base member in a second modification, and FIG. 32 is a perspective view of a gland packing material in the second modification.

FIGS. 35 to 41 show conventional arts.

FIG. 35 is a perspective view of a gland packing material of conventional art 1, and FIG. 36 is a perspective view of a gland packing material of conventional art 2.

FIG. 37 is a perspective view of a gland packing which is formed by braiding the gland packing material of conventional art 1, and FIG. 38 is a perspective view of a gland packing which is formed by twisting the gland packing material of conventional art 1.

FIG. 39 is a perspective view of a gland packing which is formed by braiding the gland packing material of conventional art 2, and FIG. 40 is a perspective view of a gland packing which is formed by twisting the gland packing material of conventional art 2.

FIG. 41 is a perspective view of a gland packing material of conventional art 3.

BEST MODE FOR CARRYING OUT THE INVENTION

Hereinafter, preferred embodiments of the invention will be described with reference to the drawings.

First Embodiment

Figure 1:
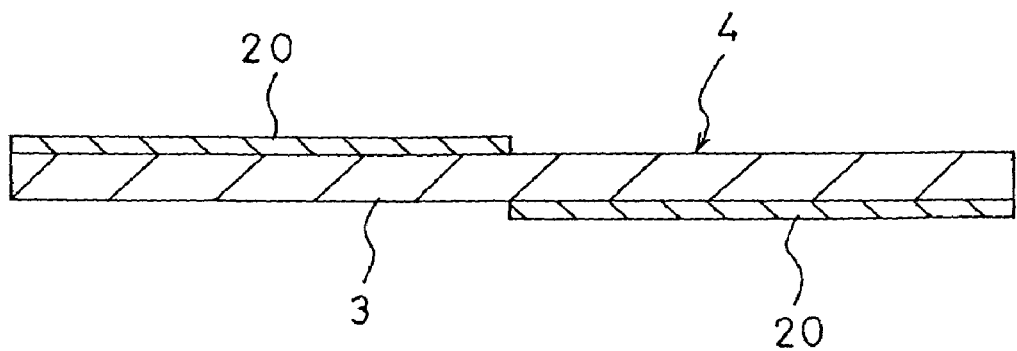
Figure 1:
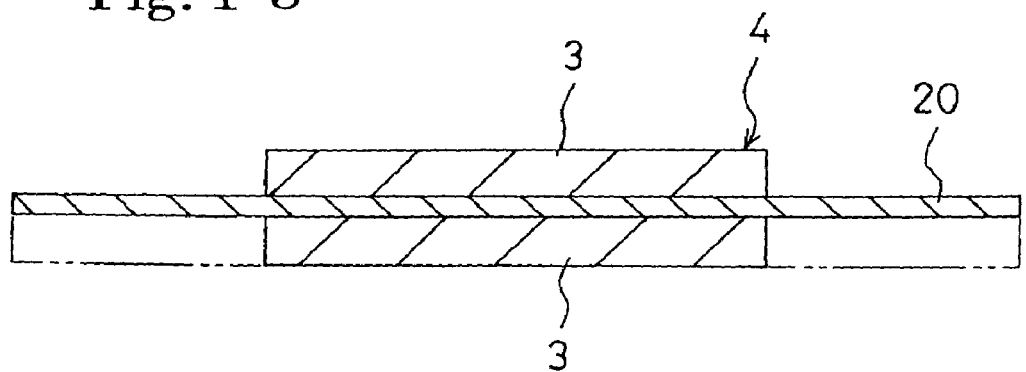

FIGS. 1 to 4 show a first embodiment of the gland packing material of the invention, and FIG. 1 is a perspective view of the gland packing material. Referring to FIG. 1, the gland packing material (1) is configured by a cord-like member (40) which is formed by sequentially stranding a strip-like base member (4) in the longitudinal direction with starting from an end. The base member (4) comprises: a sheet-like reinforcing member (20) configured by many long carbon fibers (2) which are very thin; and a strip-like expanded graphite (3). The reinforcing member (20) is disposed on one face of the strip-like expanded graphite (3). In the base member (4), one side end edge is placed on an outer peripheral surface of the cord-like member (40). In the one side end edge, the strip-like expanded graphite (3) which is one member (4a) is more elongated in the width direction than the reinforcing member (20) which is another member (4b).

Figure 4:
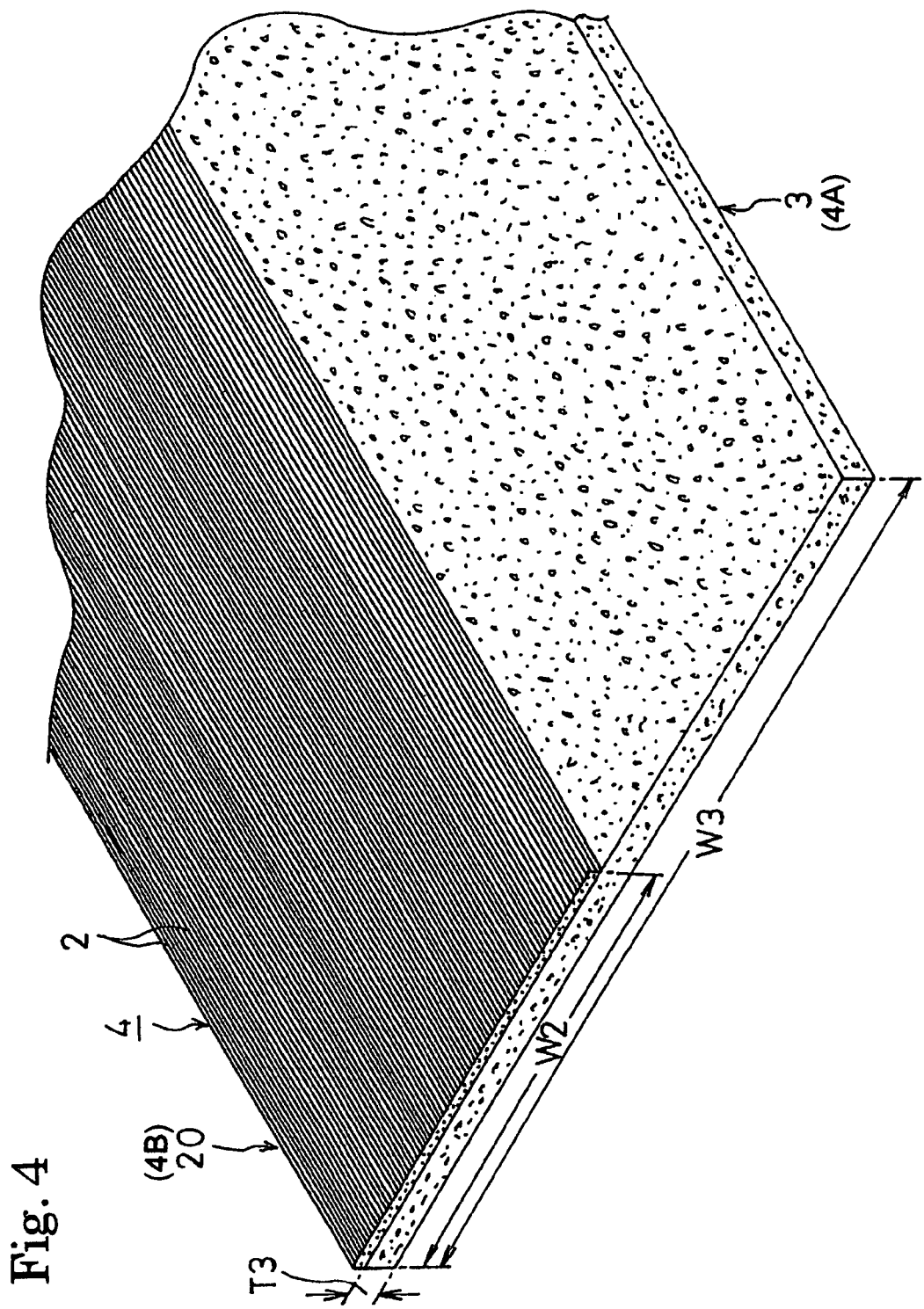

Namely, as shown in FIG. 4, in one side end edge of the base member (4), the reinforcing member (20) and the strip-like expanded graphite (3) overlap with each other, but, in the other side end edge, the strip-like expanded graphite (3) is more elongated in the width direction than the reinforcing member (20). As a result of the abovementioned stranding process, the other side end edge is placed on the outer peripheral surface of the cord-like member (40).

The stranding process is applied so that the strip-like expanded graphite (3) which is the one member (4a) that is elongated in the width direction is placed on the inner side, and the reinforcing member (20) which is the other member (4b) that is short in the width direction is placed on the outer side. As shown in FIG. 1, therefore, the gland packing material (1) has a structure in which the reinforcing member (20) and the strip-like expanded graphite (3) are stranded in a spiral manner so as to be alternately arranged in the axial direction on the outer peripheral surface of the cord-like member (40).

The carbon fibers (2) have a property that they are hardly broken by an external force of the level of stranding. Therefore, it is possible to obtain the gland packing material (1) having a structure in which the sheet-like reinforcing member (20) configured by the carbon fibers (2) and the strip-like expanded graphite (3) are stranded in a spiral manner so as to be alternately arranged in the axial direction on the outer peripheral surface of the cord-like member (40). Because of the structure, an excellent shape-retaining property is ensured by the sheet-like reinforcing member (20), and an excellent sealing property is ensured by the strip-like expanded graphite (3). Therefore, the gland packing material (1) can satisfactorily exert both the functions of the shape-retaining property and the sealing property.

Also when the stranding process is applied after the strip-like base member (4) is wound about the longitudinal direction, a gland packing material (1) having an appearance and structure which are similar to those described above can be formed, and the material can function and attain effects in a similar manner as the above-described material.

For example, the gland packing material (1) can be produced in the following procedure.

First, the base member (4) is formed in the following procedure.

Figure 3:
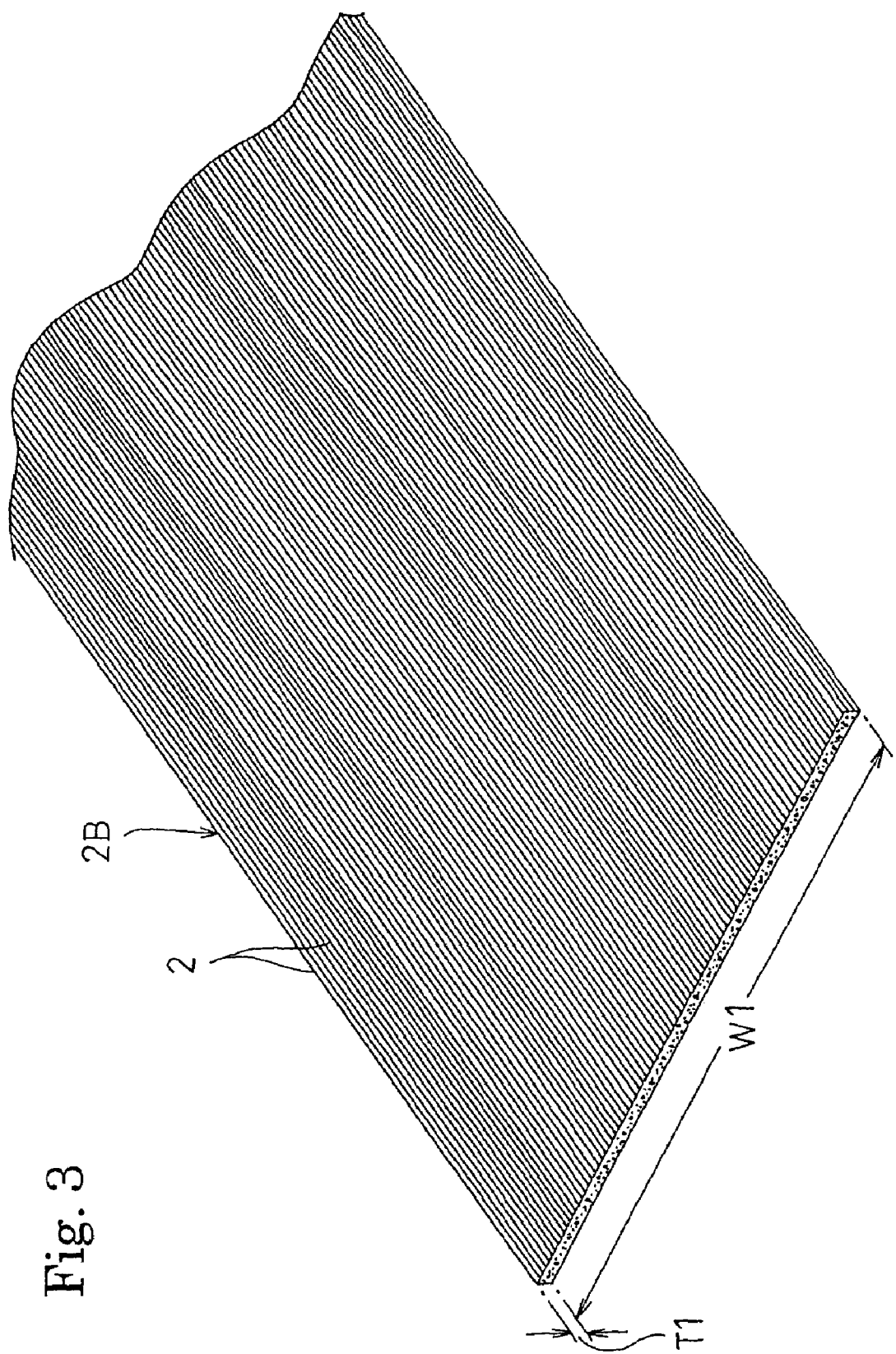

As shown in FIG. 2, initially, a multifilament yarn in which, for example, 12,000 carbon fibers (2) each having a diameter of 7 μm are bundled is used to form a fiber bundle (2A) in which the fibers are bundled in a flat shape having a width (W)=4.00 mm and a thickness (T)=0.20 mm. Then, the fiber bundle (2A) is fiber-opened to a sheet-like shape so as to be extended in the width direction, whereby a fiber-opened sheet (2B) having a width (W1)=12.00 mm and a thickness (T1)=0.06 mm is formed as shown in FIG. 3.

For example, the fiber opening process is conducted in the following manner. First, the fiber bundle (2A) is heated to soften a sizing agent for the fiber bundle, and the fiber bundle (2A) is fed in the longitudinal direction while controlling the speed of the fiber bundle. An air flow is blown in a crossing direction while maintaining a predetermined overfeed amount. In a portion where the air flow passes, the fiber bundle (2A) is arcuately strained to be unbound in the width direction, and the sizing agent is cooled and hardened, thereby forming the extended fiber-opened sheet (2B).

As shown in FIG. 4, next, the reinforcing member (20) configured by fiber-opened sheet (2B) is laid on one face of the strip-like expanded graphite (3) having a width (W3)=24.00 mm and a thickness (T3)=0.25 mm, to form the base member (4) in which the reinforcing member (20) configured by the carbon fibers (2) is disposed on one face of the strip-like expanded graphite (3). The width (W2) of the reinforcing member (20) is one half of the width (W3) of the strip-like expanded graphite (3). In the base member (4), therefore, the strip-like expanded graphite (3) and the reinforcing member (20) are aligned with each other in one side end edge, and the strip-like expanded graphite (3) is more elongated in the width direction than the reinforcing member (20) in the other side end edge.

Then, the base member (4) is stranded to be formed into the cord-like member (40), thereby producing the gland packing material (1).

Figure 5:
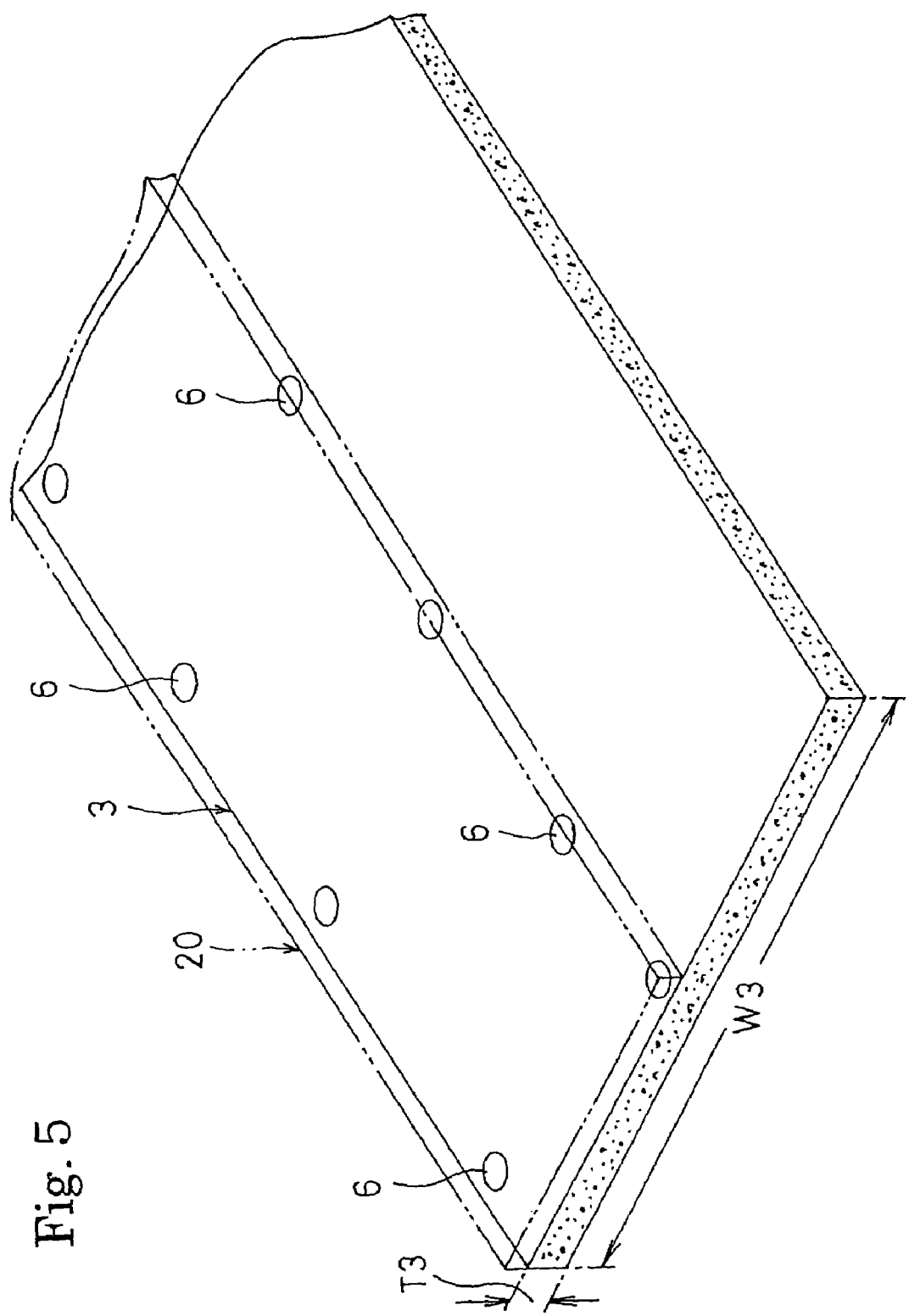

Preferably, an adhesive agent is omitted in the base member (4) because of the following reasons. When an adhesive agent is omitted, the properties of the strip-like expanded graphite such as the affinity and the compression recovery property can be prevented from being lowered by hardening of the adhesive agent, and, even when used under a high temperature condition, reduction of the sealing property due to burning of the adhesive agent can be prevented from occurring. In the base member (4), however, the coupling force between the reinforcing member (20) and the strip-like expanded graphite (3) may be enhanced by using a small amount of adhesive agent. Specifically, as shown in FIG. 5, for example, an adhesive agent (6) of epoxy resin, acrylic resin, phenol resin, or like resin may be disposed in a spot-like manner on one face of the strip-like expanded graphite (3) having a width (W3)=24.00 mm and a thickness (T3)=0.25 mm, and the sheet-like reinforcing member (20) may be laid on one face of the strip-like expanded graphite (3) in this state to form the base member (4). The adhesive agent (6) is used in a spot-like manner so that the used amount is restricted to a very small level. Therefore, the properties of the strip-like expanded graphite (3) such as the affinity and the compression recovery property are prevented from being lowered by hardening of the adhesive agent (6), and, even when used under a high temperature condition, reduction of the sealing property due to burning of the adhesive agent is decreased.

Figure 6:
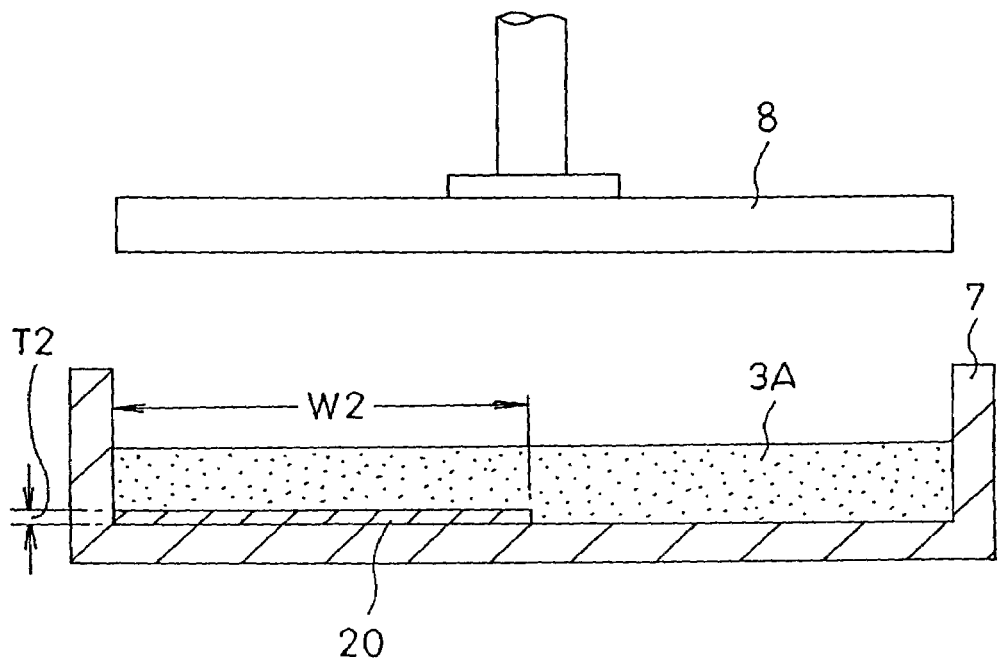
Figure 7:
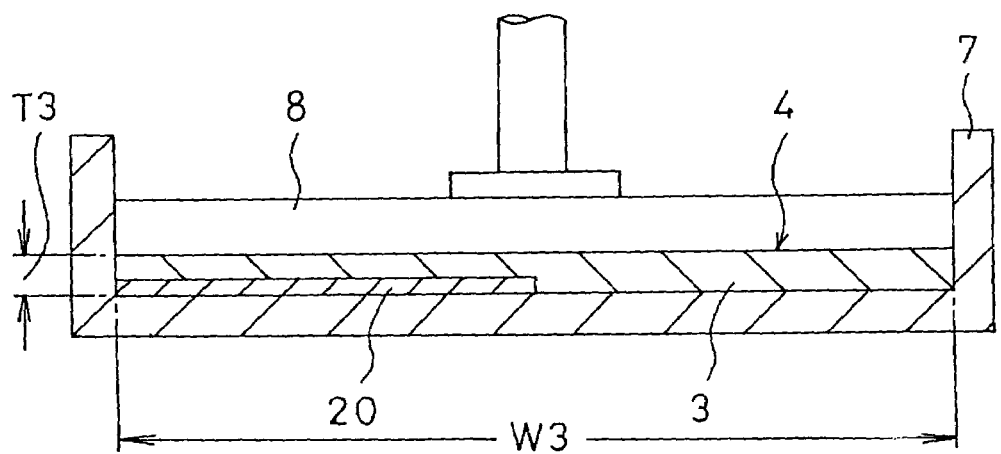

Alternatively, as shown in FIGS. 6 and 7, for example, the base member (4) may be formed by, when expanded graphite powder (3A) is to be compression-molded to the strip-like expanded graphite (3), disposing the reinforcing member (20) to be integrated with one face of the strip-like expanded graphite (3). Specifically, as shown in FIG. 6, the reinforcing member (20) having a width (W2)=12.00 mm and a thickness (T2)=0.06 mm is placed in a mold (7), and expanded graphite powder (3A) is superimposed on the reinforcing member. As shown in FIG. 7, a compression-molding process is then applied with using a pressing mold (8), thereby forming the base member (4) in which the sheet-like reinforcing member (20) is disposed on one face of the strip-like expanded graphite (3) that is compressed so as to have a width (W3)=24.00 mm and a thickness (T3) =0.25 mm.

It is a matter of course that, in the fibrous material, the reinforcing member, and the strip-like expanded graphite which are used in the invention, the thickness of the fibers, the number of the bundled fibers, the width of the sheet, the thickness of the sheet, the width and thickness of the strip-like expanded graphite, and the like are not restricted to those in the first embodiment described above.

As the carbon fibers (2), however, it is preferable to use fibers each having a diameter of 3 μm to 15 μm. When the diameter is smaller than 3 μm, the fibers may be broken during the stranding process, and, when the diameter is larger than 15 μm, the fibers are hardly stranded. The carbon fibers (2) exert a higher sealing property as their diameter is smaller. Therefore, it is most preferable to set the diameter of the carbon fibers (2) to a range of 5 μm to 9 μm. In the invention, in place of carbon fibers, other brittle fibers, or tough fibers may be used. In the case where tough fibers such as metal fibers are used, such fibers have high bendability, and hence it is less likely that they are broken during the stranding process. In such a case, therefore, thinner fibers may be used.

Moreover, the thickness (T1) of the fiber-opened sheet (2B), i.e., the thickness (T2) of the reinforcing member (20) is preferably set to a range of 10 μm to 300 μm, and more preferably to a range of 30 μm to 100 μm. When the thickness (T2) is smaller than 10 μm, the reinforcement effect is reduced, and a uniform sheet is hardly produced. When the thickness (T2) is larger than 300 μm, the reinforcement effect can be enhanced, but the stranding process is hardly applied and leakage from a reinforcing member portion easily occurs.

In the first embodiment, the strip-like expanded graphite (3) is formed so as to be elongated in the width direction in one of side end edges of the base member (4). In the invention, in place of the above, the reinforcing member (20) may be formed so as to be elongated in the width direction.

Figure 8:
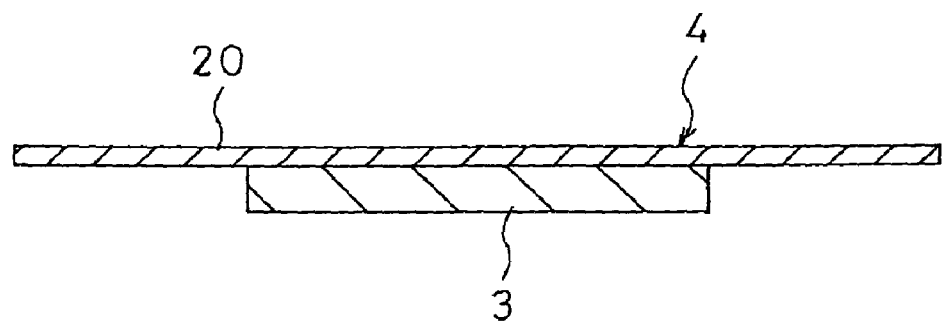

In a first modification shown in FIG. 8, the sheet-like reinforcing member (20) which is configured by the carbon fibers (2), and which is wider than the strip-like expanded graphite (3) is laid on one face of the strip-like expanded graphite (3), thereby forming the base member (4). In this case, the reinforcing member (20) is more elongated in the width direction than the strip-like expanded graphite (3) in a side end edge of the base member (4). The stranding process is applied while the reinforcing member (20) that is the one member (4a) which is elongated in the width direction is placed on the inner side, and the strip-like expanded graphite (3) that is the other member (4b) which is short in the width direction is placed on the outer side.

Figure 9:
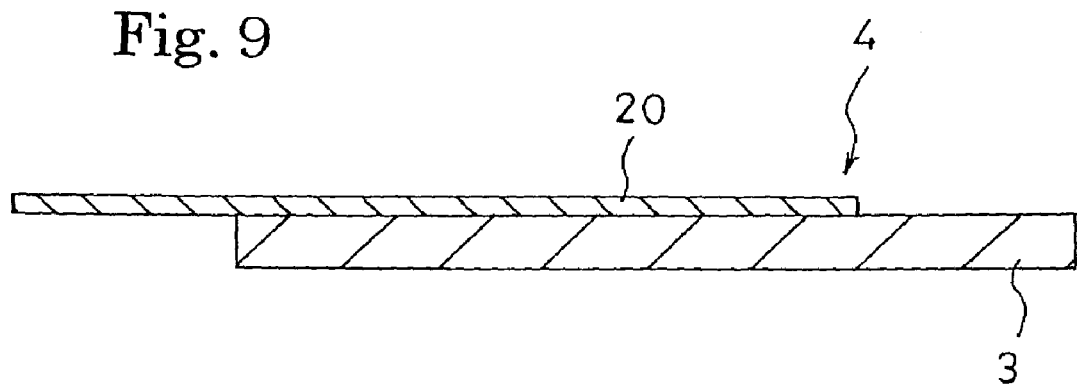

In a second modification shown in FIG. 9, the strip-like expanded graphite (3) and the sheet-like reinforcing member (20) which have the same width overlap with each other while shifting from each other in the width direction, to form the base member (4). When a stranding process is applied to the base member (4), the member is formed into the cord-like member (40). The stranding process is applied so that, in one side end edge of the base member (4) which is placed on the outer peripheral surface of the cord-like member (40), the member that is elongated in the width direction is placed on the inner side.

Figure 10:
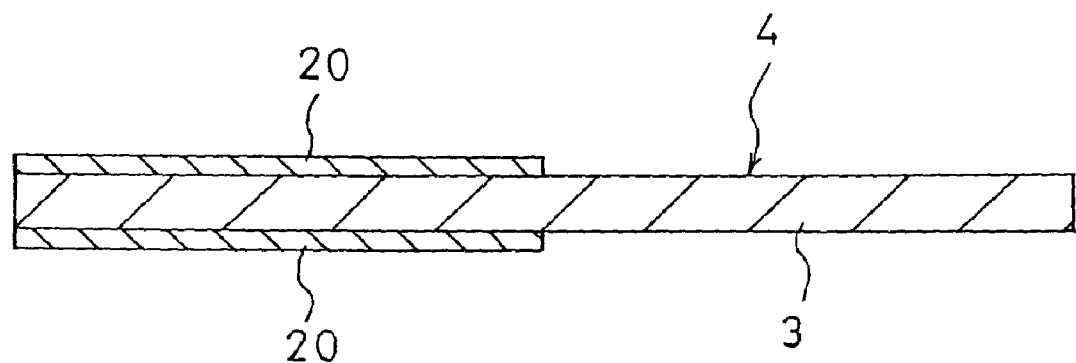

FIGS. 10 and 11 show a third modification of the first embodiment of the invention. In the third modification, as shown in FIG. 10, reinforcing members (20) which are smaller in width than the strip-like expanded graphite (3) are laid respectively on the front and rear of the striplike expanded graphite (3) so as to be opposed to each other, while the reinforcing members are deviated toward one side in the width direction of the strip-like expanded graphite (3), thereby forming the base member (4). When the thus formed base member (4) is stranded or wound to be stranded, it is possible to obtain the gland packing material (1) having a structure in which, as shown in FIG. 11, the reinforcing member (20) and the strip-like expanded graphite (3) are stranded in a spiral manner so as to be alternately arranged in the axial direction. In the gland packing material (1), an excellent shape-retaining property and an excellent sealing property can be ensured. Since an involved amount of the reinforcing members (20) which are involved in the cord-like member (40) is increased, moreover, the internal reinforcement can be more strongly applied, and the tensile strength of the gland packing material (1) is further enhanced.

In a fourth embodiment shown in FIG. 12, reinforcing members (20) which are smaller in width than the strip-like expanded graphite (3) are laid respectively on the both faces of the strip-like expanded graphite (3) so as to be deviated from each other on the front and rear of the strip-like expanded graphite (3), thereby forming the base member (4). When the base member (4) is stranded or wound to be stranded, it is possible to obtain the gland packing material (1) which is similar to that of the third modification, and in which the internal reinforcement is strongly applied.

In the third and fourth modifications, the reinforcing members (20) which are disposed respectively on the both faces of the strip-like expanded graphite (3) are formed so as to have the same width, and hence the front and rear of the base member (4) have the same shape. Therefore, the gland packing material (1) using the base member (4) can be easily produced. In the invention, however, one of the reinforcing members (20) which is to be wound into the cord-like member (40) may be formed so as to have the same width as the strip-like expanded graphite (3).

FIG. 13 shows a fifth modification of the first embodiment of the invention. Strip-like expanded graphites (3·3) which are smaller in width than the sheet-like reinforcing member (20) are laid respectively on the both faces of the sheet-like reinforcing member (20), to form the base member (4). In the case where the strip-like expanded graphites (3) are disposed respectively on the both faces of the reinforcing member (20) as in the fifth modification, one of the strip-like expanded graphites (3) which is on the inner side in the formation of the cord-like member (40) may be formed so as to have the same width as the reinforcing member (20) as indicated by, for example, the phantom lines in FIG. 13.

Second Embodiment

Figure 14:
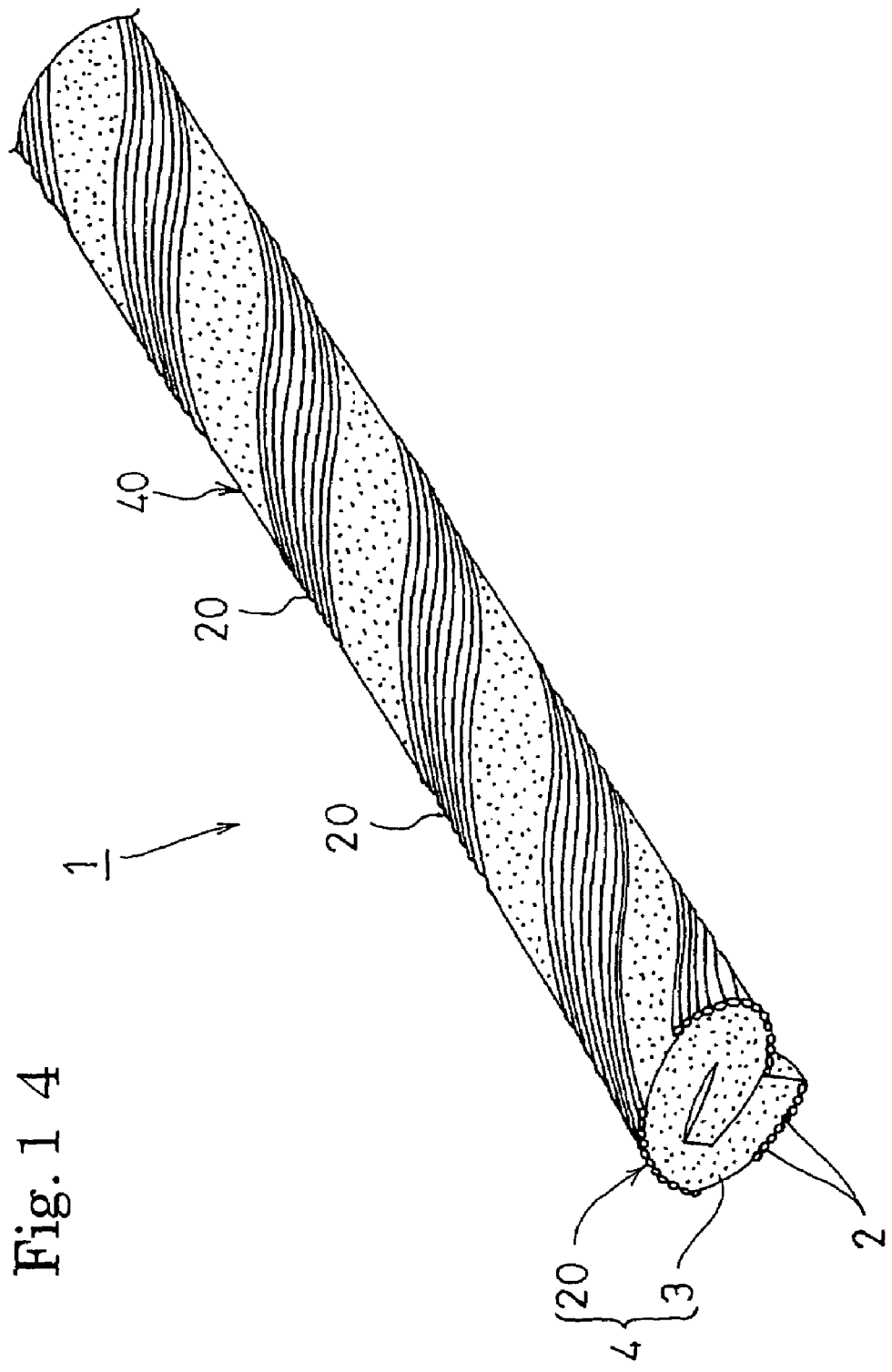
Figure 15:
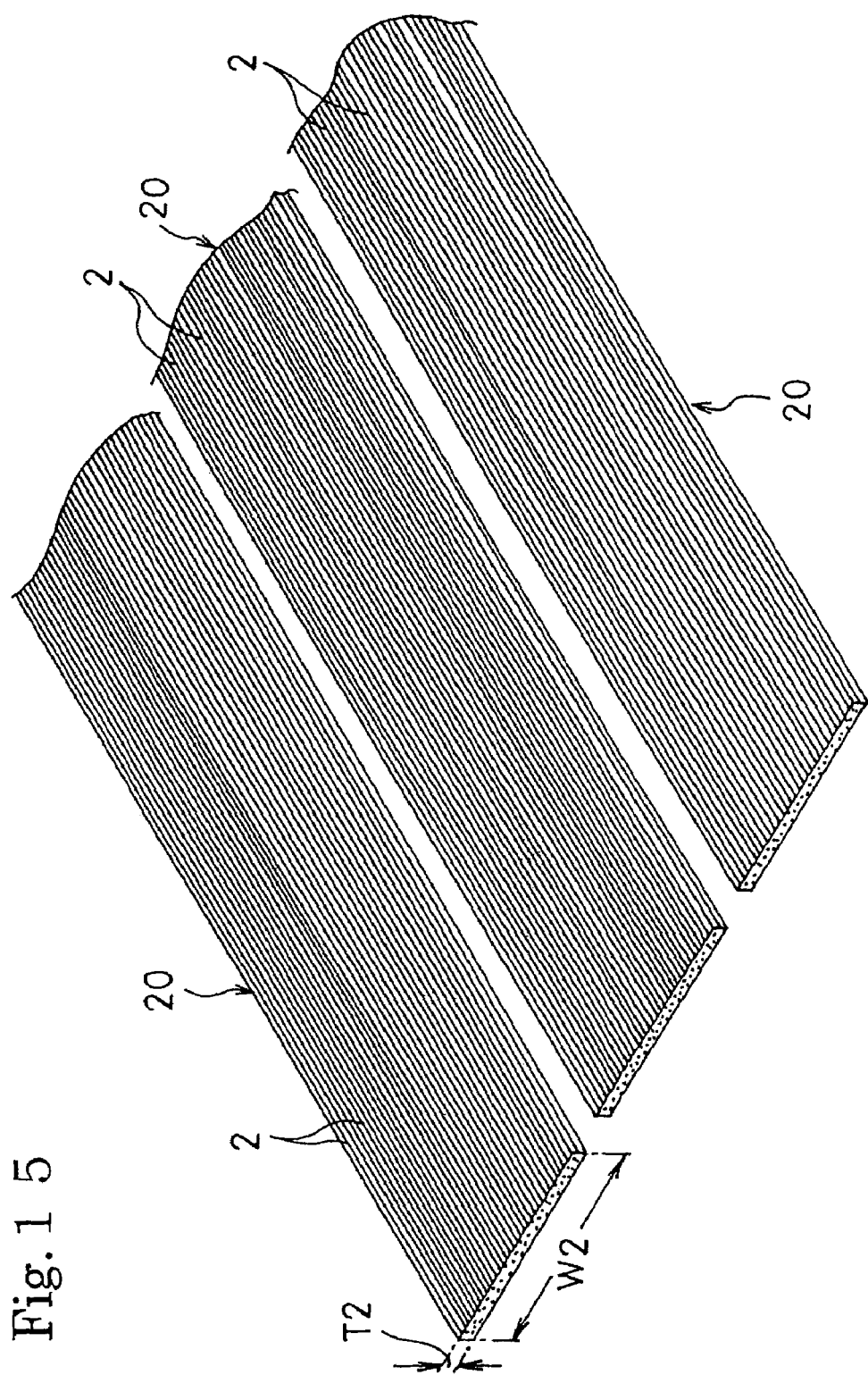
Figure 16:
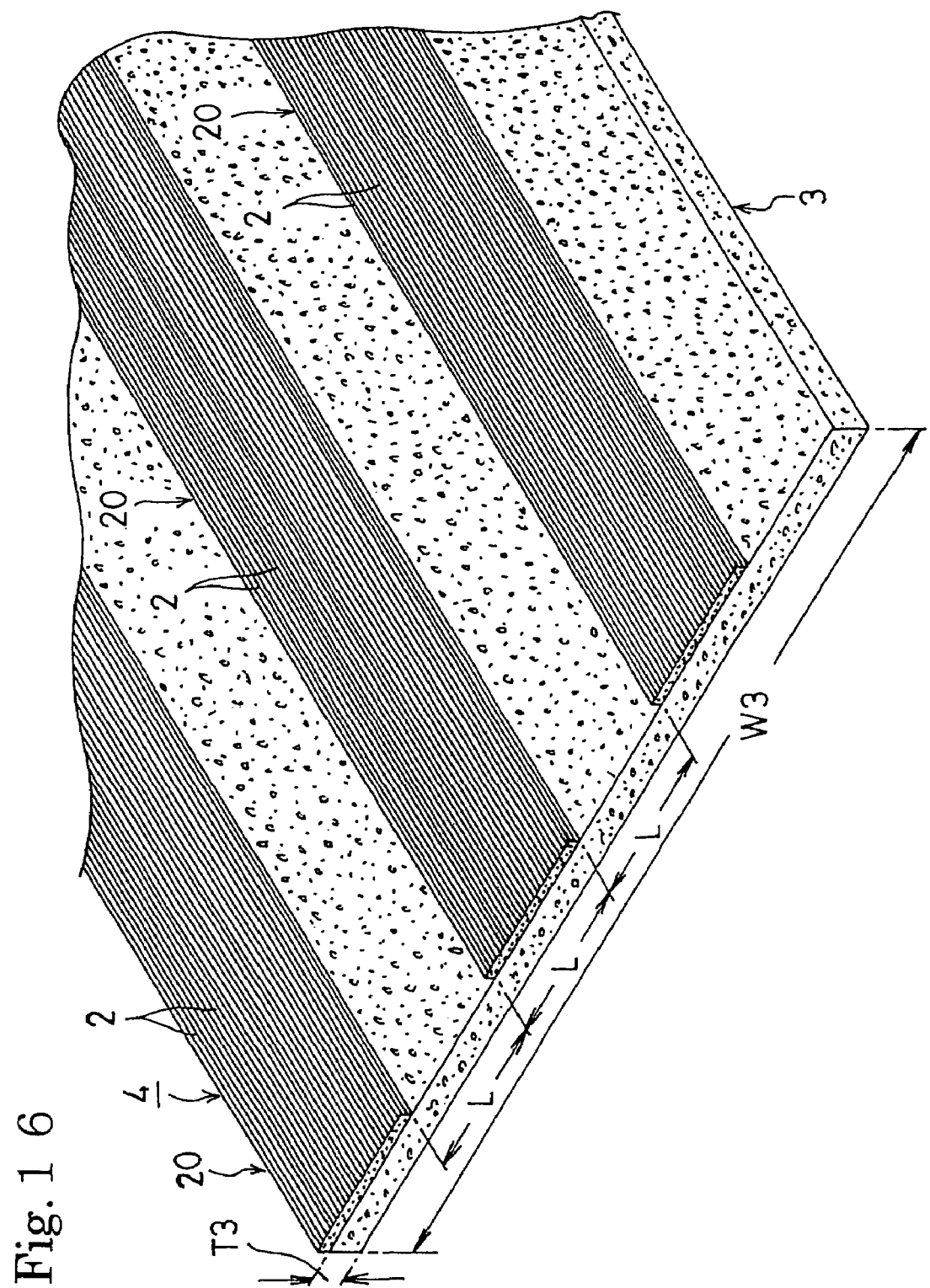

FIGS. 14 to 16 show a second embodiment of the gland packing material of the invention, and FIG. 14 is a perspective view of the gland packing material. Referring to FIG. 14, in the same manner as the first embodiment described above, the gland packing material (1) is configured by the cord-like member (40) which is formed by sequentially stranding the strip-like base member (4) in the longitudinal direction with starting from an end. The base member (4) comprises: the sheet-like reinforcing member (20) configured by the many long carbon fibers (2) which are very thin; and the strip-like expanded graphite (3). The reinforcing member (20) is disposed on one face of the strip-like expanded graphite (3).

The reinforcing member (20) is formed so as to be smaller in width than the strip-like expanded graphite (3), and a plurality of the reinforcing members are disposed on one face of the strip-like expanded graphite (3) with forming intervals therebetween in the width direction. As shown in FIG. 16, for example, three small-width sheet-like reinforcing members (20) are laid on one face of the strip-like expanded graphite (3) with forming intervals therebetween in the width direction, thereby forming the base member (4).

The stranding process is applied so that the small-width reinforcing members (20) are placed on the outer side. As shown in FIG. 14, therefore, the gland packing material (1) has a structure in which the reinforcing members (20) and the strip-like expanded graphite (3) are stranded in a spiral manner so as to be alternately arranged in the axial direction on the outer peripheral surface of the cord-like member (40).

The other configuration is similar to that of the first embodiment, and functions and attains effects in a similar manner. Therefore, its description is omitted.

Also when the stranding process is applied after the strip-like base member (4) is wound about the longitudinal direction, a gland packing material (1) having an appearance and structure which are similar to those described above can be formed, and the material can function and attain effects in a similar manner as the above-described material.

For example, the gland packing material (1) can be produced in the following procedure.

The fiber-opened sheet (2B) which is used in the first embodiment, and which is shown in FIG. 3 is divided in the width direction into plural (for example, three) sections, so that, as shown in FIG. 15, three reinforcing members (20) each having a width (W2)=4.00 mm and a thickness (T2) =0.06 mm are formed.

As shown in FIG. 16, then, the three reinforcing members (20) are laid on one face of the strip-like expanded graphite (3) having a width (W3)=24.00 mm and a thickness (T3) =0.25 mm, with forming predetermined intervals (L) therebetween in the width direction of the strip-like expanded graphite (3), thereby forming the base member (4) in which the three reinforcing members (20•20•20) configured by the carbon fibers (2) are disposed on one face of the strip-like expanded graphite (3). For example, the predetermined intervals (L) are set to a value which is equal to the width (W2) of the reinforcing members (20). In the invention, the intervals (L) may be set to a value which is different from the width (W2).

Figure 17:
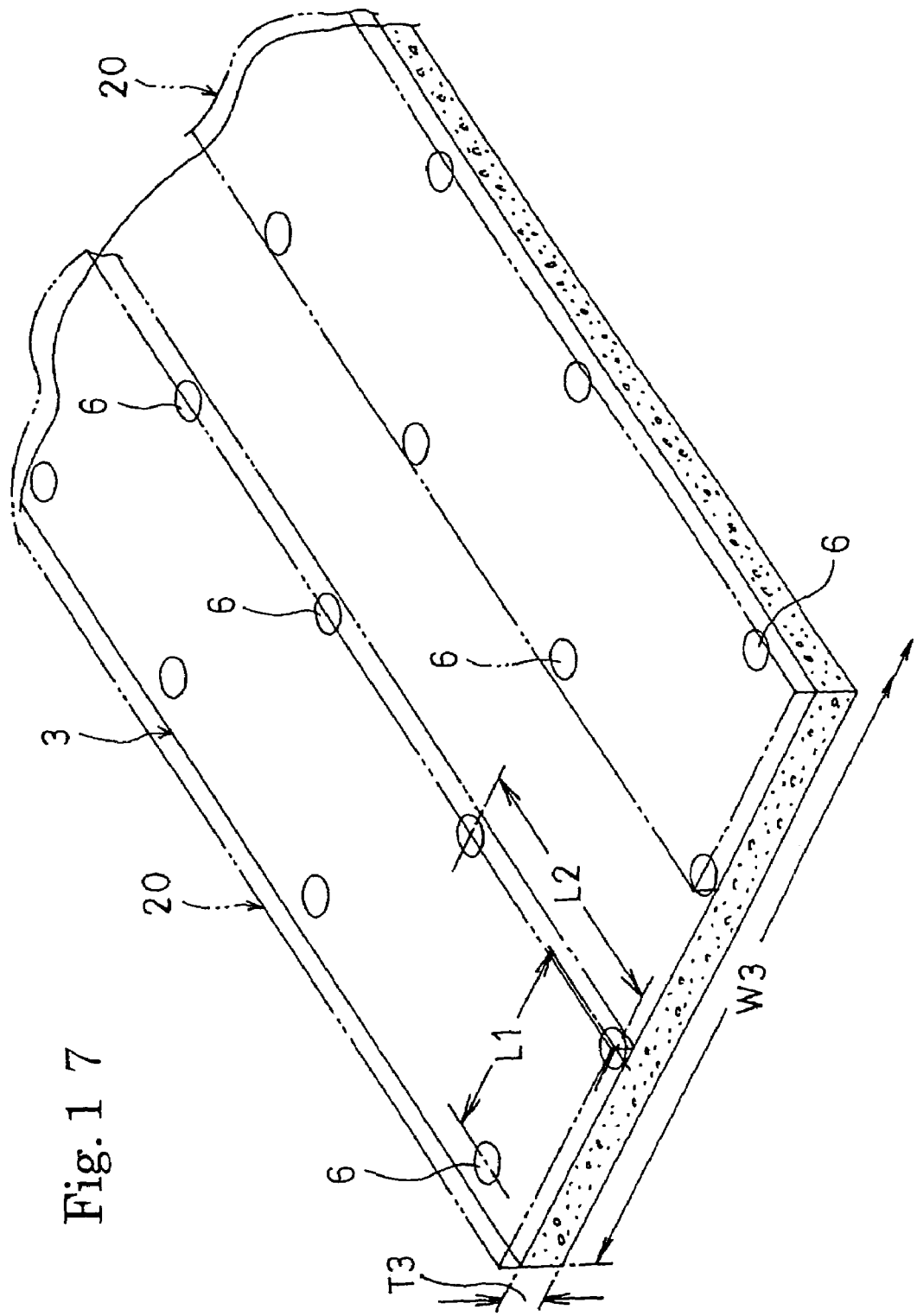

In the same manner as the first embodiment, in the base member (4), the coupling force between the reinforcing members (20) and the strip-like expanded graphite (3) may be enhanced by using a small amount of adhesive agent. Specifically, as shown in FIG. 17, for example, an adhesive agent (6) of epoxy resin, acrylic resin, or phenol resin may be disposed in a spot-like manner on the upper face of the strip-like expanded graphite (3) having a width (W3)=24.00 mm and a thickness (T3)=0.25 mm, and the three reinforcing members (20•20•20) may be bonded to one face of the strip-like expanded graphite (3) in this state to form the base member (4). With respect to the intervals of the spots of the adhesive agent (6), for example, the intervals (L1) in the width direction is set to be substantially equal to the width (W2) of the reinforcing member (20), and the intervals (L2) in the longitudinal direction is set to a value which is larger than the intervals (L1) in the width direction. However, the intervals are not restricted to these values.

In the same manner as the first embodiment, the base member (4) may be formed by, when expanded graphite powder is to be compression-molded to the strip-like expanded graphite (3), disposing the reinforcing members (20) to be integrated with one face of the strip-like expanded graphite (3).

In the second embodiment, the sheet-like reinforcing member (20) is disposed on one face of the strip-like expanded graphite (3). In the invention, alternatively, the sheet-like reinforcing member (20) may be disposed on the both faces of the strip-like expanded graphite (3).

Figure 18:
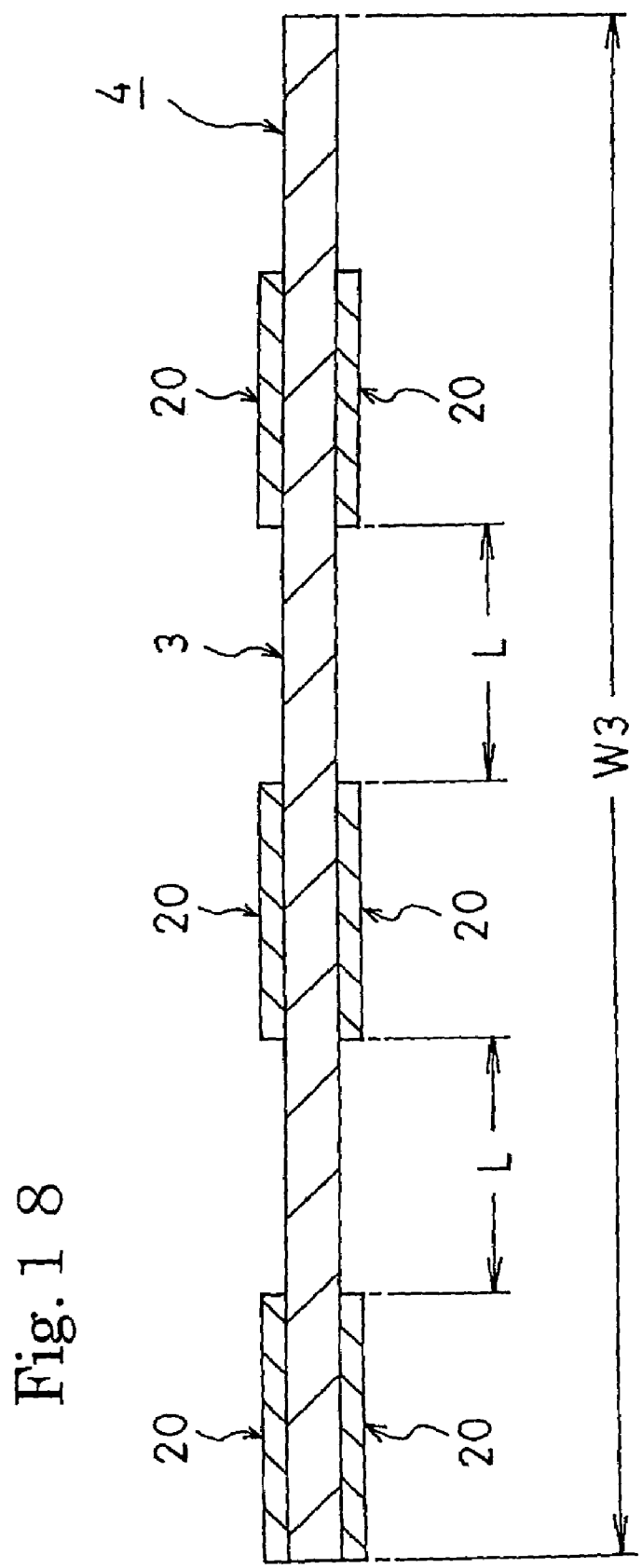
Figure 19:
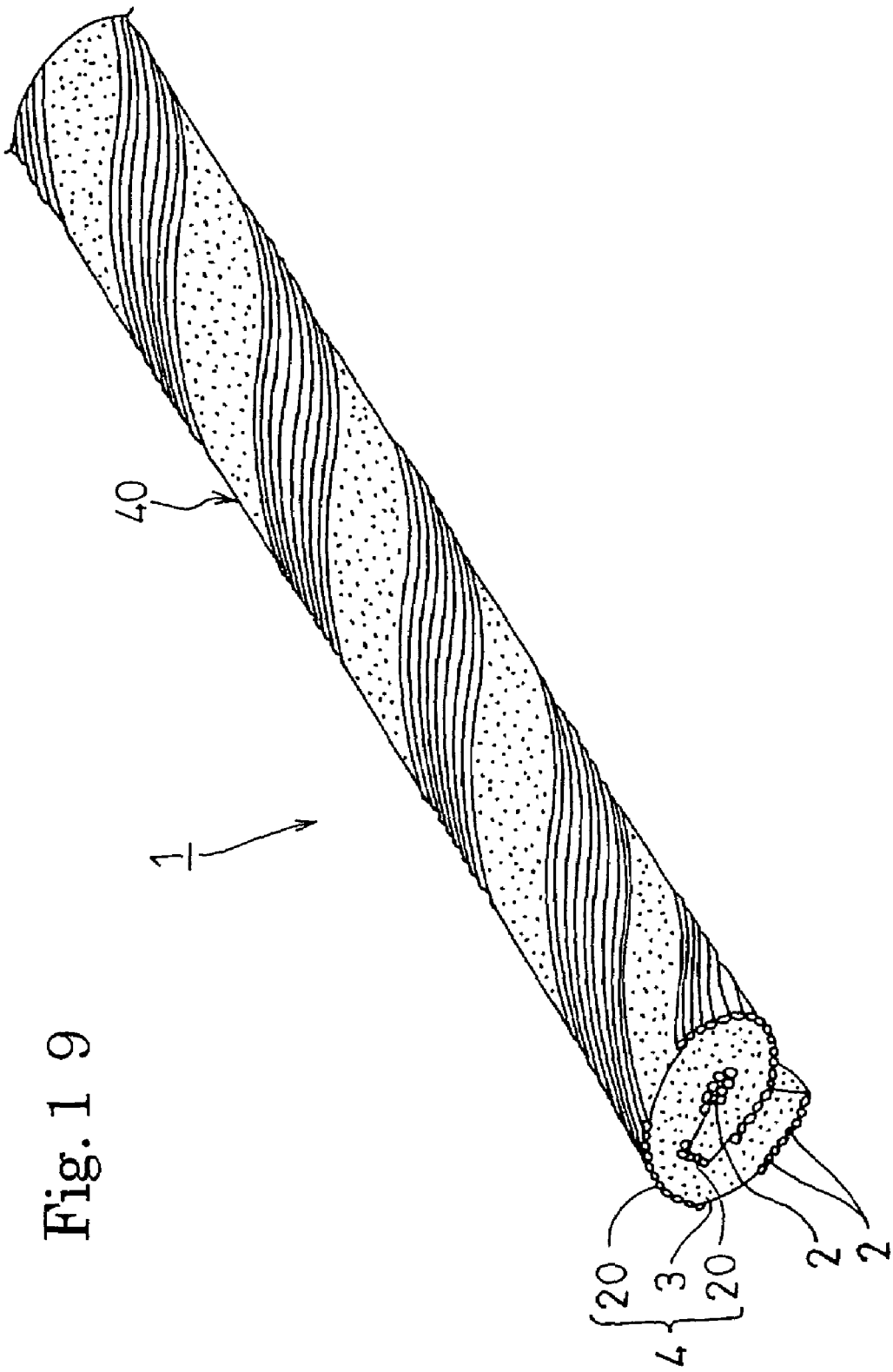

In a first modification shown in FIG. 18, for example, three reinforcing members (20) are laid on each of the faces of the strip-like expanded graphite (3) with forming predetermined intervals (L) therebetween in the width direction of the strip-like expanded graphite (3), and at positions of the front and rear of the strip-like expanded graphite (3) which are opposed to each other. Specifically, six reinforcing members (20 . . . ) configured by the carbon fibers (2) are disposed on the both faces of the strip-like expanded graphite (3) to form the base member (4). When the base member (4) is stranded or wound to be stranded, it is possible to obtain the gland packing material (1) having a structure in which, as shown in FIG. 19, the reinforcing members (20) configured by the carbon fibers (2), and the strip-like expanded graphite (3) are alternately arranged in the axial direction and stranded in a spiral manner. In the gland packing material (1), an excellent shape-retaining property and an excellent sealing property can be ensured. Since an involved amount of the reinforcing members (20) which are involved in the cord-like member (40) is increased, moreover, the internal reinforcement can be more strongly applied, and the tensile strength of the gland packing material (1) is further enhanced.

Figure 20:
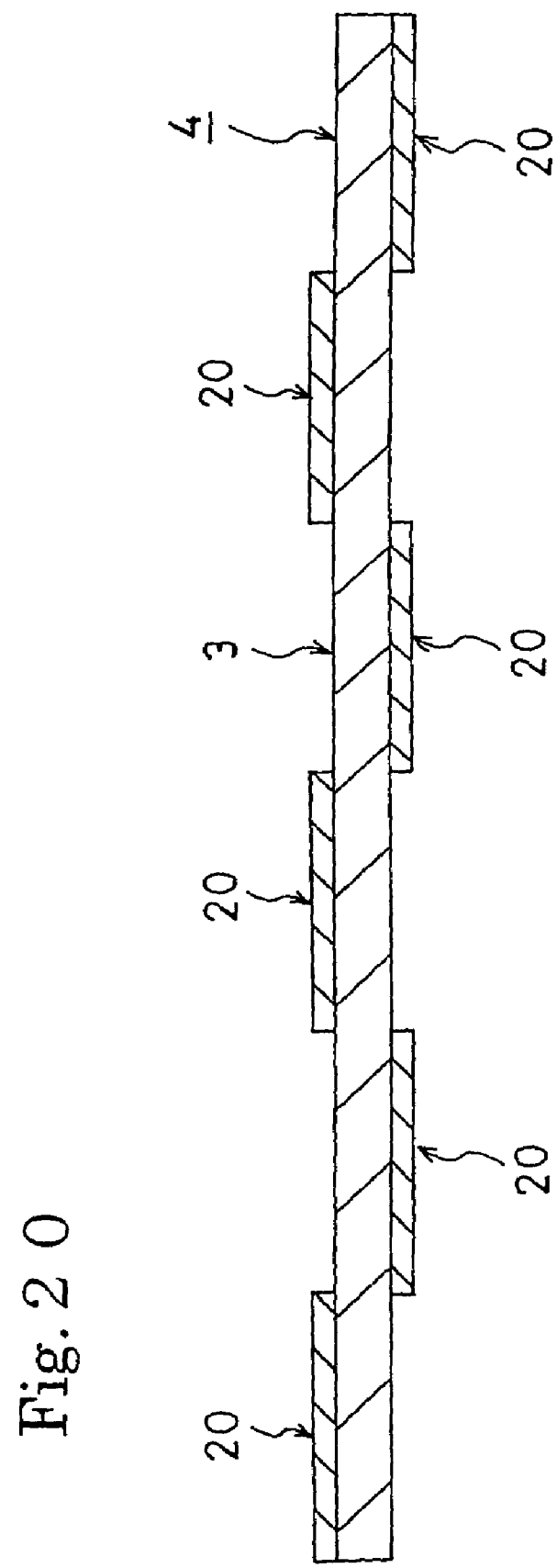

In a second modification shown in FIG. 20, the three reinforcing members (20) are laid on each of the faces of the strip-like expanded graphite (3), with forming the predetermined intervals (L) therebetween in the width direction of the strip-like expanded graphite (3), and at positions of the front and rear of the strip-like expanded graphite (3) which are deviated from each other. Also when the base member (4) is stranded or wound to be stranded, it is possible to obtain the gland packing material (1) in which the internal reinforcement is strongly applied in the same manner as the first modification.

In the modifications described above, the reinforcing members (20) which are disposed on the both faces of the strip-like expanded graphite (3) are formed so as to have the same width, and hence the front and rear of the base member (4) have the same shape. Therefore, the gland packing material (1) using the base member (4) can be easily produced. In the invention, however, one of the reinforcing members (20) which is disposed on the one face that is to be wound into the cord-like member (40) may be formed so as to have the same width as the strip-like expanded graphite (3). According to the configuration, the reinforcement effect due to the reinforcing members (20) can be further enhanced.

Third Embodiment

Figure 21:
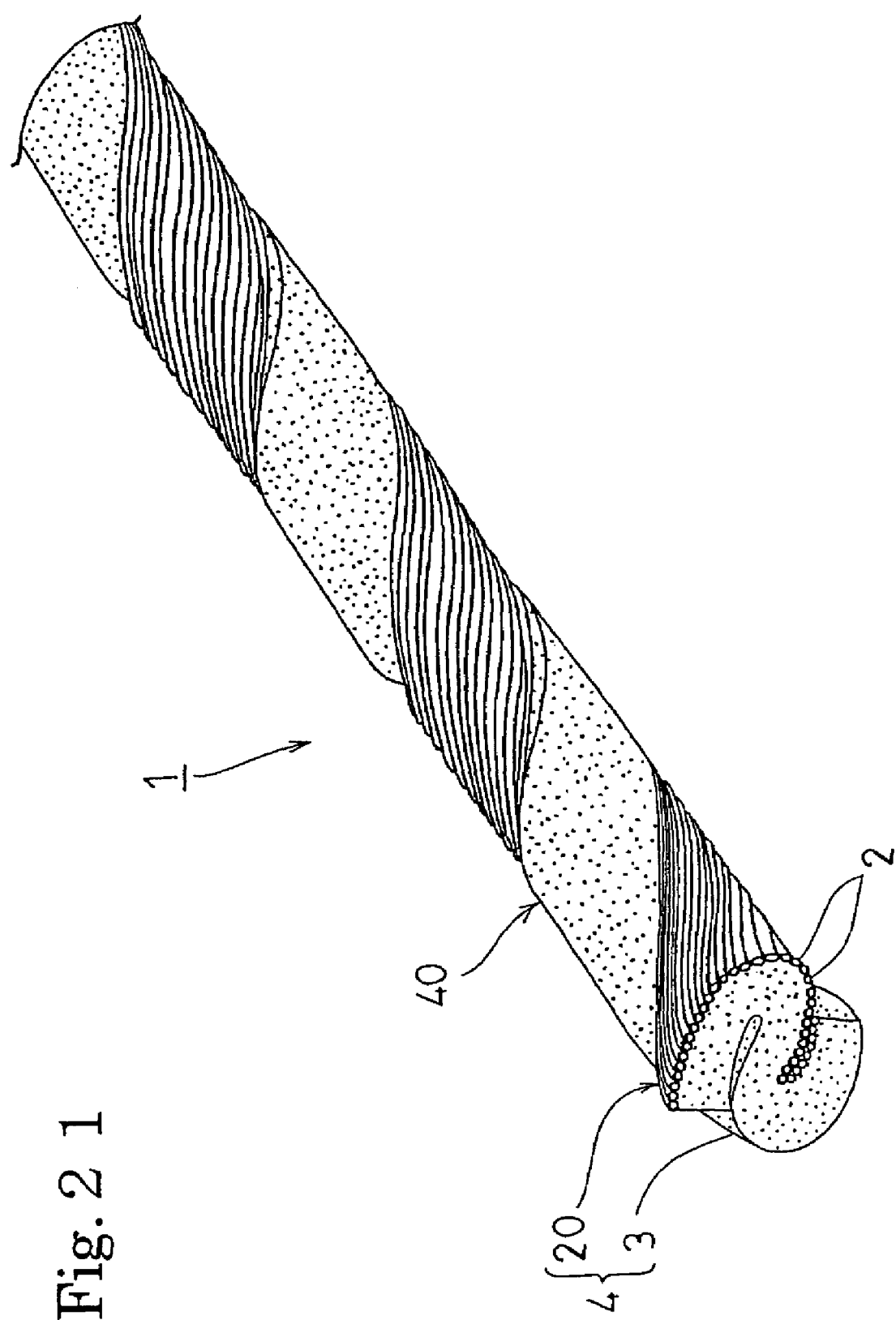
Figure 22:
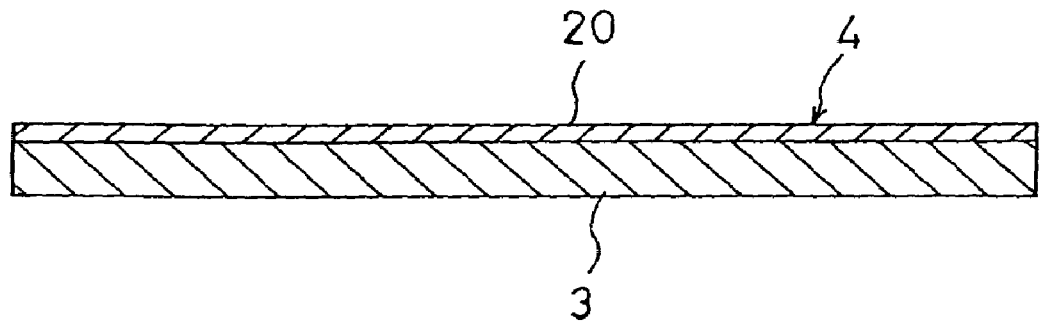

FIGS. 21 and 22 show a third embodiment of the gland packing material of the invention, and FIG. 21 is a perspective view of the gland packing material. Referring to FIG.

21, in the same manner as the first and second embodiments described above, the gland packing material (1) is configured by the cord-like member (40) which is formed by sequentially stranding the strip-like base member (4) in the longitudinal direction with starting from an end, or winding the strip-like base member (4) about the longitudinal direction and then stranding the member. As shown in FIG. 22, for example, the base member (4) comprises: the sheet-like reinforcing member (20) configured by the many long carbon fibers (2) which are very thin; and the strip-like expanded graphite (3) which has the same width as the member. The reinforcing member (20) is disposed on one face of the strip-like expanded graphite (3).

The stranding process is applied about an intermediate portion in the width direction of the base member (4) so that the section shape is formed into, for example, an S-like shape, or applied after the strip-like base member (4) is wound about the longitudinal direction in an intermediate portion in the width direction of the base member (4). Therefore, the both side end edges of the base member (4) are positioned on the outer peripheral surface of the cord-like member (40), and, in one of the side end edges, the reinforcing member (20) is placed on the outer side, and, in the other side end edge, the strip-like expanded graphite (3) is placed on the outer side. As a result, the gland packing material (1) has a structure in which, as shown in FIG. 21, the reinforcing member (20) and the strip-like expanded graphite (3) are stranded in a spiral manner so as to be alternately arranged in the axial direction on the outer peripheral surface of the cord-like member (40).

The other configuration is similar to that of the first and second embodiments, and functions and attains effects in a similar manner. Therefore, its description is omitted.

Figure 23:
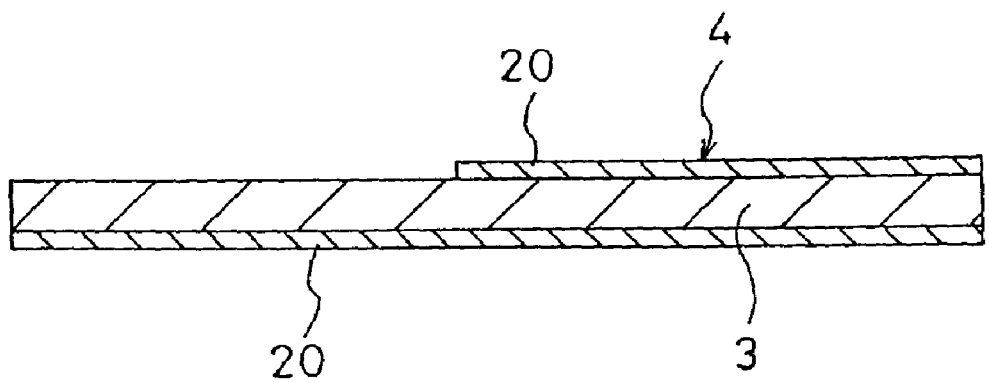
FIGS. 23 and 24 show modifications of a base member in the third embodiment.

In the third embodiment, the reinforcing member (20) is disposed only on one face of the strip-like expanded graphite (3). Alternatively, as in a first modification shown in FIG. 23, for example, the reinforcing member (20) may be disposed on each of the strip-like expanded graphite (3). In this case, one of the reinforcing members (20) (the upper side one in FIG. 23) is formed so that one side end edge is shorter than the strip-like expanded graphite (3), thereby causing the strip-like expanded graphite (3) in the side end edge to be placed in the surface of the cord-like member (40).

Figure 24:
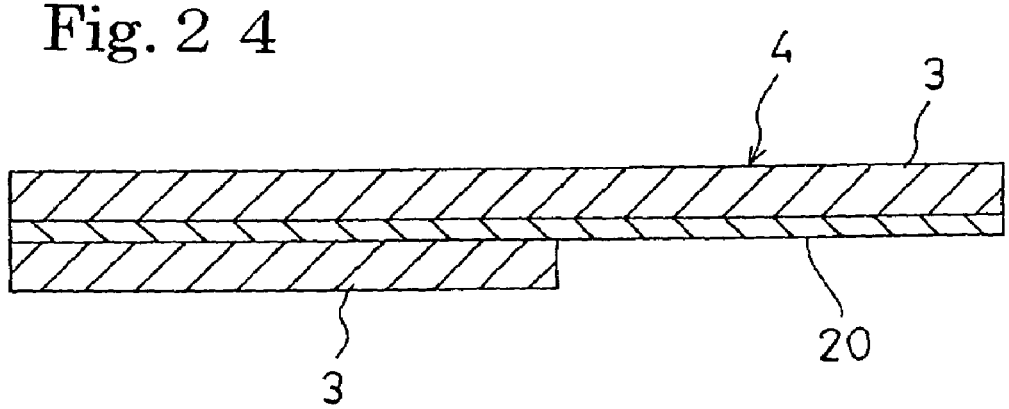

In a second modification of the third embodiment shown in FIG. 24, the strip-like expanded graphite (3) is disposed on each of the faces of the sheet-like reinforcing member (20). In this case, one of the strip-like expanded graphites (3) (the lower side one in FIG. 24) is formed so that one side end edge is shorter than the reinforcing member (20), thereby causing the reinforcing member (20) in the side end edge to be placed in the surface of the cord-like member (40).

Fourth Embodiment

Figure 25:
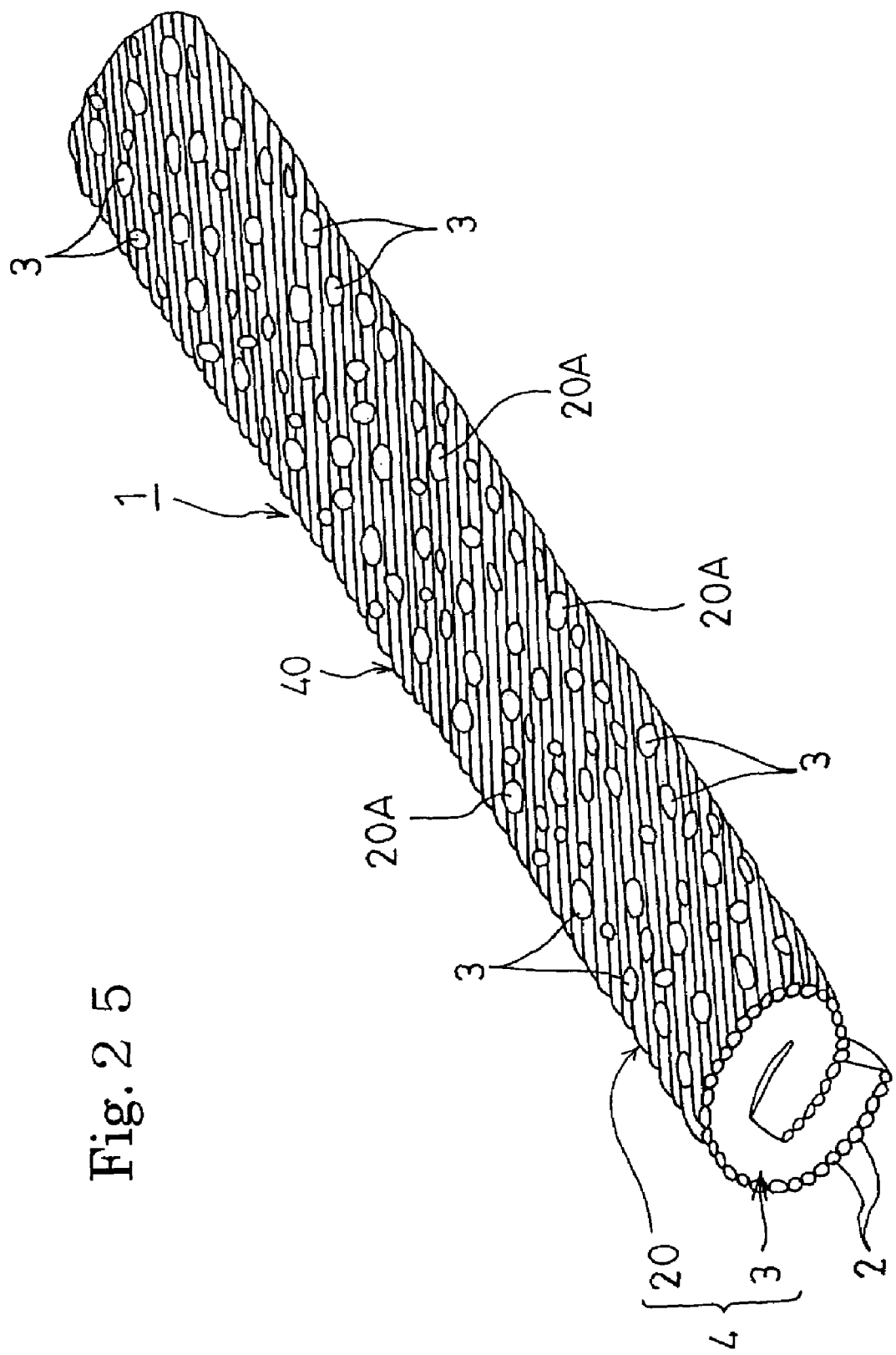
FIGS. 25 to 29 show a fourth embodiment of the gland packing material of the invention.

FIGS. 25 to 29 show a fourth embodiment of the gland packing material of the invention, and FIG. 25 is a perspective view of the gland packing material. Referring to FIG. 25, in the same manner as the embodiments described above, the gland packing material (1) is configured by the cord-like member (40) which is formed by sequentially stranding the strip-like base member (4) in the longitudinal direction with starting from an end. The base member (4) comprises: the sheet-like reinforcing member (20) configured by the many long carbon fibers (2) which are very thin; and the strip-like expanded graphite (3). The reinforcing member (20) is disposed on one face of the strip-like expanded graphite (3).

Figure 26:
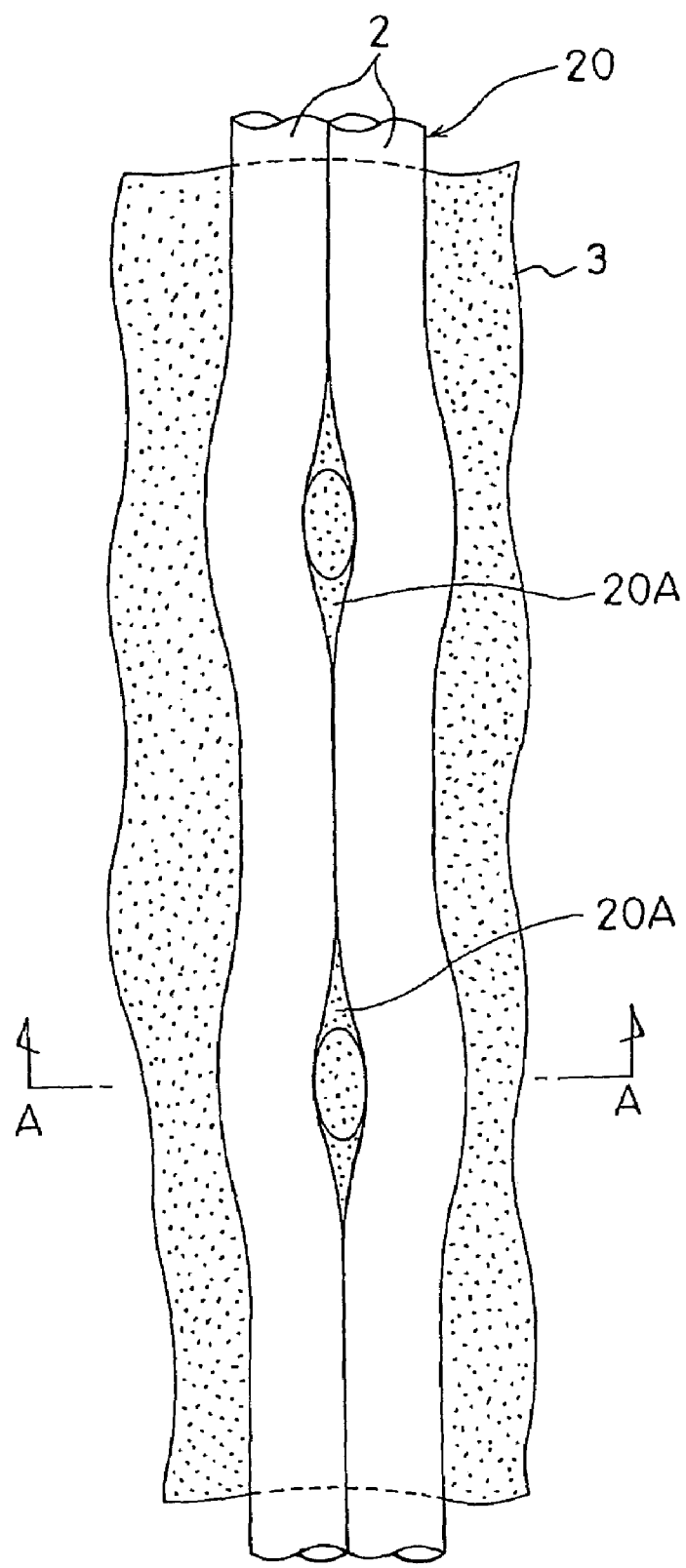
Figure 27:
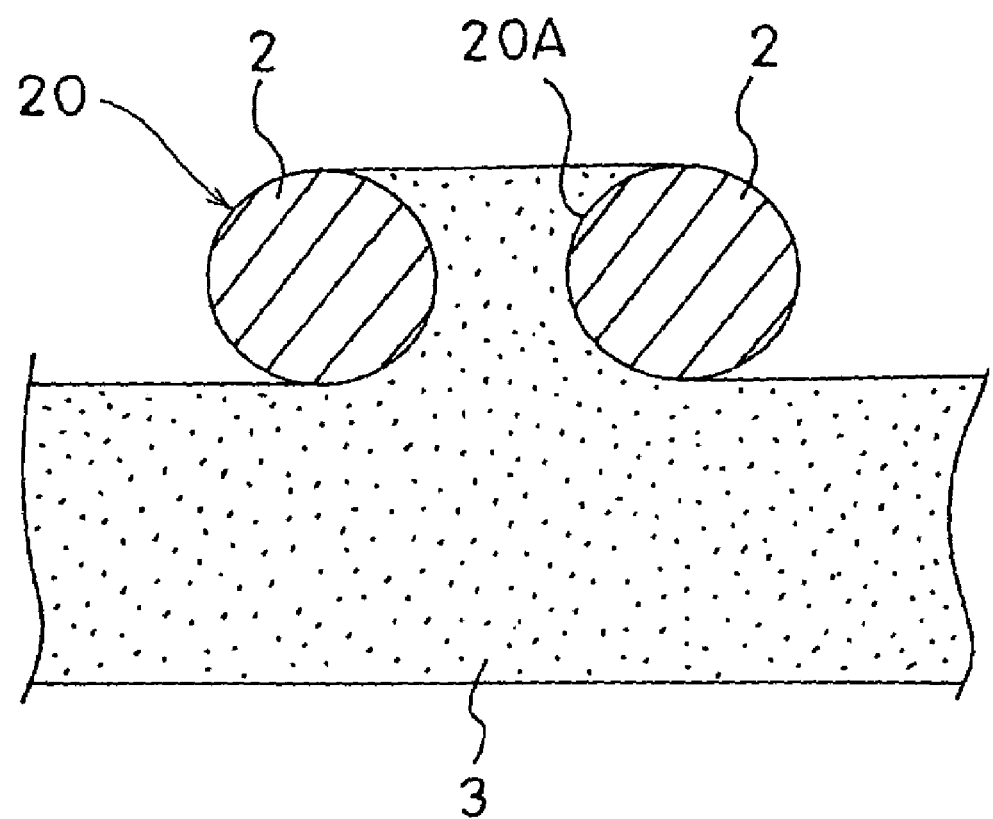

The reinforcing member (20) is placed on the outer peripheral surface of the cord-like member (40). As shown in FIG. 26, a large number of openings (20A . . . ) are formed in the reinforcing member (20). As shown in FIG. 27, the strip-like expanded graphite (3) enters the openings (20A) to be exposed flushly or substantially flushly from the outer peripheral surface of the cord-like member (40) through the openings (20A). As shown in FIG. 25, therefore, the strip-like expanded graphite (3) is randomly dispersed in the surface of the reinforcing member (20) configured by the carbon fibers (2) which are placed in the outer peripheral surface of the cord-like member (40), so that the surface of the gland packing material (1) has a mixed structure of the reinforcing member (20) and the strip-like expanded graphite (3). According to the configuration, an excellent shape-retaining property is ensured by the sheet-like reinforcing member (20), and an excellent sealing property is ensured by the strip-like expanded graphite (3). Therefore, the gland packing material (1) can satisfactorily exert both the functions of the shape-retaining property and the sealing property.

The large number of openings (20A . . . ) can be configured by many local clefts which are formed by slightly forcedly tearing in an artificial manner many portions of the reinforcing member (20) configured by the many long carbon fibers (2) that are very thin, in such a manner that adjacent carbon fibers (2) are separated from each other.

For example, the gland packing material (1) can be produced in the following procedure.

First, the base member (4) is formed in the following procedure.

Figure 28:
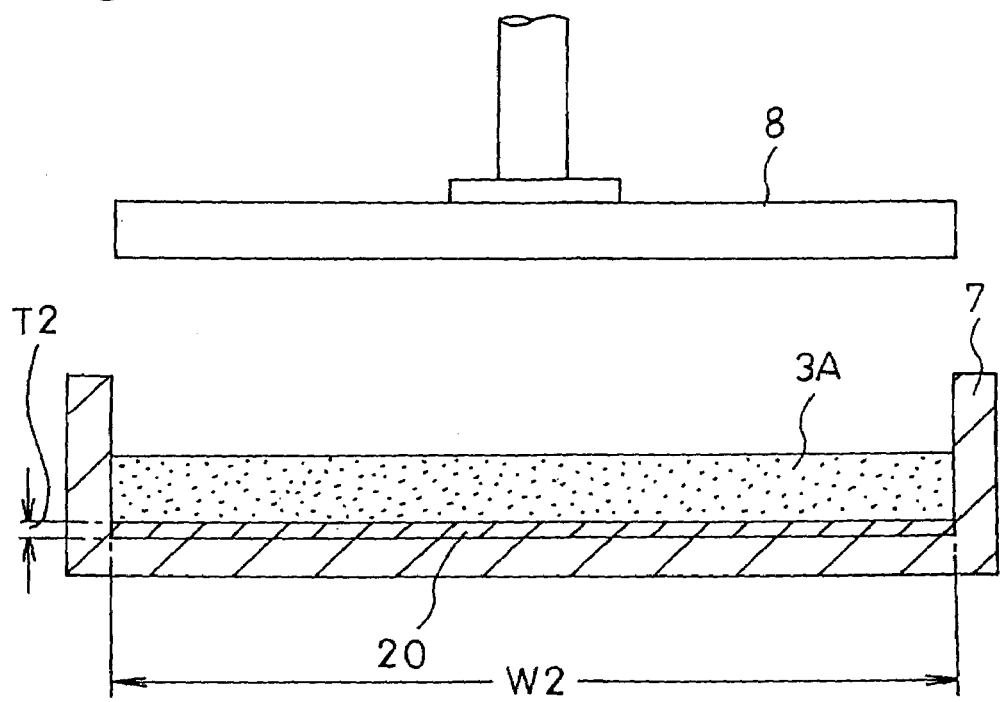

Initially, the sheet-like reinforcing member (20) configured by carbon fibers is formed in the same manner as the first embodiment. Then, many portions of the reinforcing member (20) are slightly forcedly torn in an artificial manner in such a manner that adjacent carbon fibers (2) are separated from each other, thereby forming many local clefts in the reinforcing member (20). The clefts constitute the openings (20A . . . ). The sheet-like reinforcing member (20) comprising the large number of openings (20A . . . ) and having a width (W2)=24.00 mm and a thickness (T2)=0.06 mm is placed in the mold (7) as shown in FIG. 28.

Figure 29:
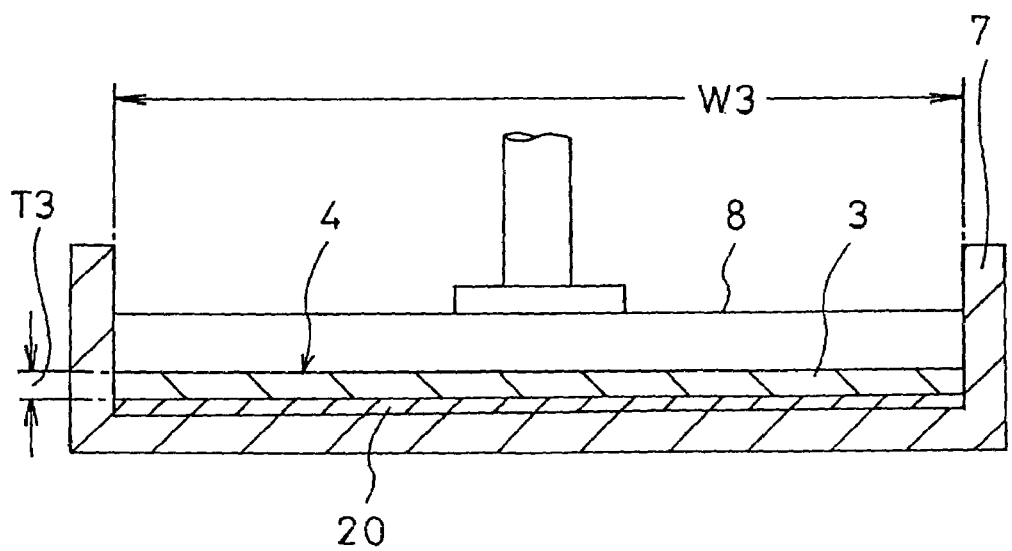
Figure 3:
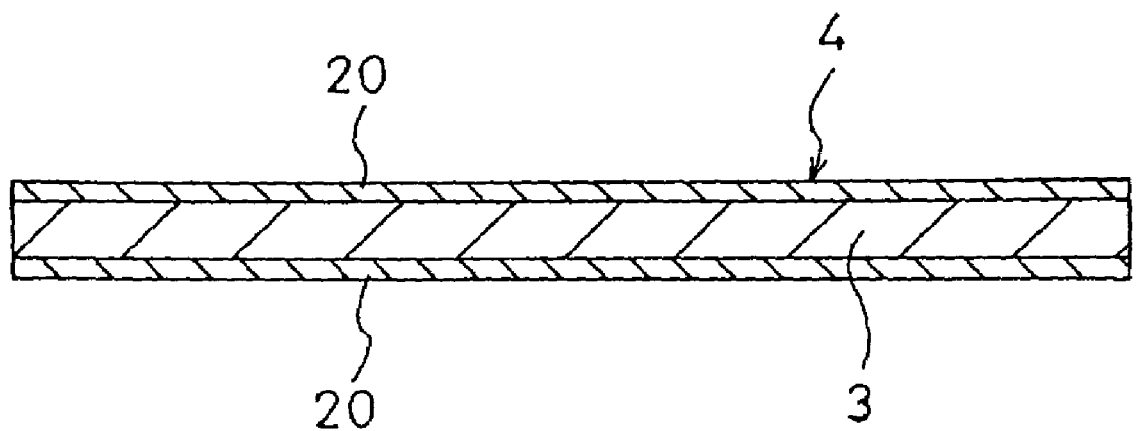

Expanded graphite powder (3A) is laid on the sheet-like reinforcing member (20) which is placed in the mold (7). As shown in FIG. 29, thereafter, a compression-molding process is then applied with using the pressing mold (8), thereby forming the base member (4) in which the reinforcing member (20) configured by the carbon fibers (2) is disposed on one face of the strip-like expanded graphite (3) having a width (W3)=24.00 mm and a thickness (T3)=0.25 mm. As shown in FIGS. 26 and 27, the strip-like expanded graphite (3) enters the openings (20A) to be exposed flushly or substantially flushly from the surface of the reinforcing member (20). Therefore, the base member (4) has a mixed structure of the reinforcing member (20) and the strip-like expanded graphite (3) in which the strip-like expanded graphite (3) is randomly dispersed in the surface of the reinforcing member (20) configured by the carbon fibers (2). A stranding process is applied to the thus formed base member (4) in a state where the reinforcing member (20) is outward directed, and the cord-like member (40) is formed, thereby producing the gland packing material (1).

FIG. 30 shows a first modification of the fourth embodiment. The gland packing material (1) is configured by the cord-like member (40) which is formed by winding the base member (4) about the longitudinal direction in a state where the reinforcing member (20) is outward directed. In the first modification also, the strip-like expanded graphite (3) is randomly dispersed in the surface of the sheet-like reinforcing member (20) which is placed in the surface of the cord-like member (40). Therefore, the surface of the gland packing material (1) has a mixed structure of the reinforcing member (20) and the strip-like expanded graphite (3).

The other configuration is similar to that of the fourth embodiment, and functions in a similar manner. Therefore, its description is omitted.

When the gland packing material (1) of the first modification is further stranded in a spiral manner, the material can be formed into the gland packing material (1) having an appearance which is identical with that of the fourth embodiment.

Figure 32:
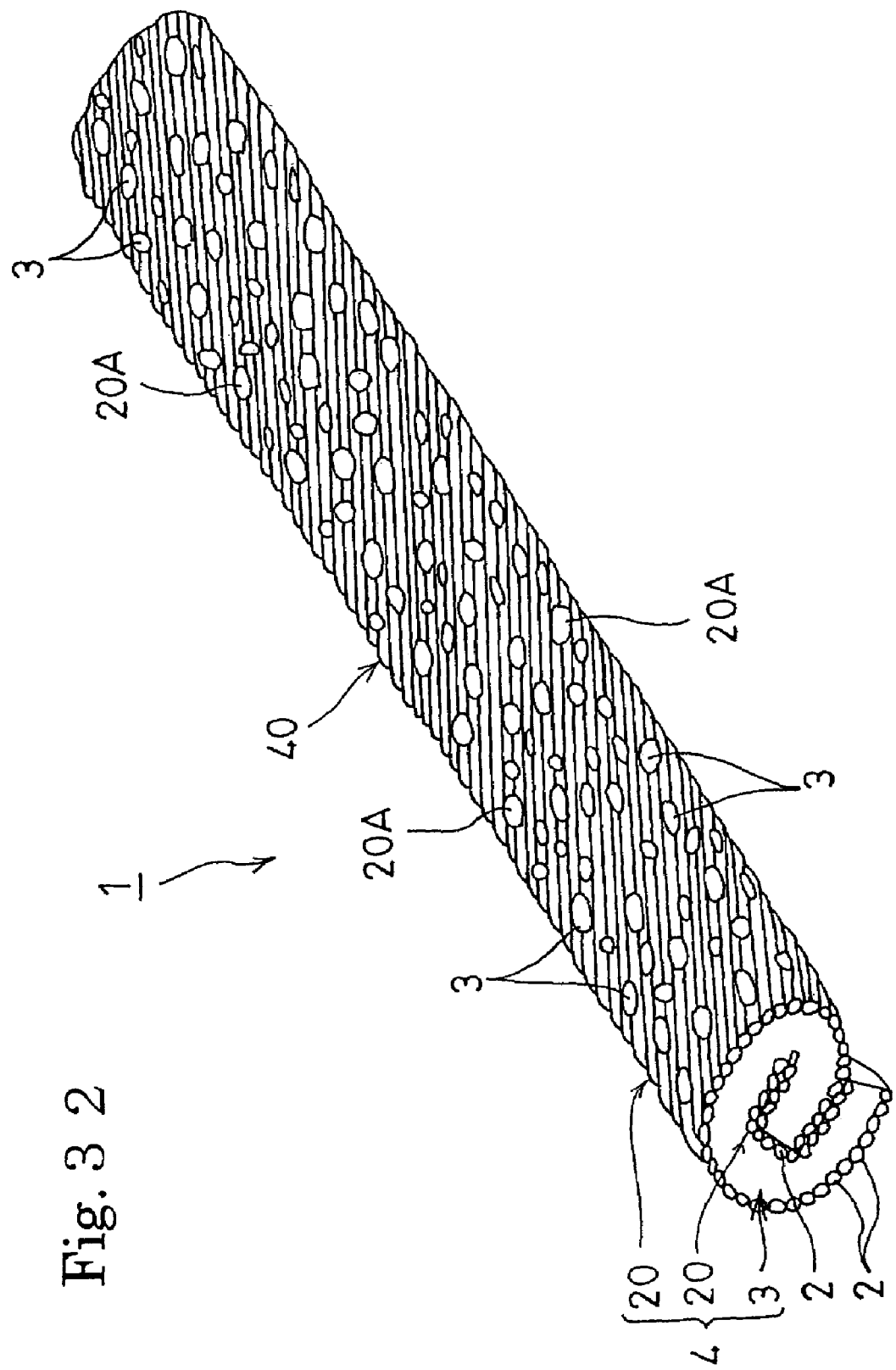

FIGS. 31 and 32 show a second modification of the fourth embodiment.

In the second modification, the reinforcing member (20) configured by the carbon fibers (2) is disposed on each of the faces of the strip-like expanded graphite (3), to configure the base member (4). In the same manner as the fourth embodiment, the gland packing material (1) is configured by the cord-like member (40) which is formed by sequentially stranding the base member (4) in the longitudinal direction with starting from an end.

In the gland packing material (1), an excellent shape-retaining property can be ensured by the reinforcing member (20) configured by the carbon fibers (2) in the surface side, and an excellent sealing property can be ensured by the strip-like expanded graphite (3). Since an involved amount of the reinforcing members (20) which are involved in the cord-like member (40) is increased, moreover, the internal reinforcement can be more strongly applied to the gland packing material (1), and the tensile strength of the material can be further enhanced.

In the embodiments described above, carbon fibers are used as the fibrous material. In the invention, alternatively, other brittle fibers, and tough fibers may be used. Examples of such brittle fibers are glass fibers such as E-glass, T-glass, C-glass, and S-glass, silica fibers, and ceramic fibers such as alumina and alumina-silica. Such brittle fibers exhibit a low sliding resistance. Therefore, the rotation performance or axial sliding performance of the counter member can be improved, and an excellent heat resistance can be attained.

Examples of the tough fibers are metal fibers such as stainless steel, aramid fibers, and PBO fibers. These tough fibers have high bendability. Therefore, the production of the gland packing material in which the base member is stranded, wound, or wound to be stranded is facilitated, and hence the productivity is improved. As a result, it is possible to provide an economical gland packing material, and also to improve the durability of the gland packing material.

Although a fiber-opened sheet is used as the sheet configured by a fibrous material, the fibrous material which is useful in the invention may be formed into a sheet-like shape by other means.

Next, the gland packing of the invention which is produced with using the gland packing material will be described.

Figure 33:
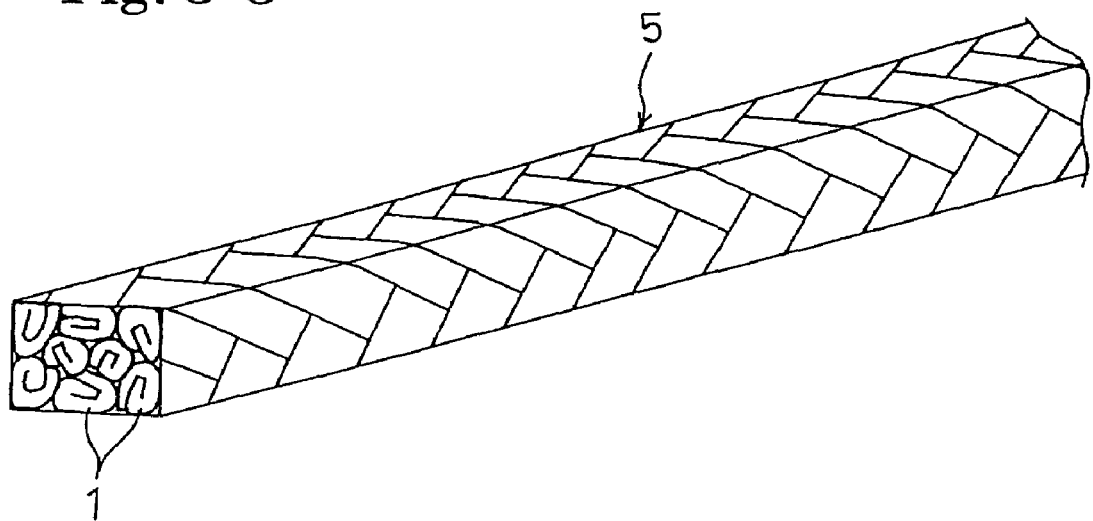
FIG. 33 is a perspective view showing an embodiment of the gland packing of the invention.

FIG. 33 is a perspective view showing an embodiment of the gland packing of the invention.

The cord-like gland packing (5) is produced by preparing a plurality of the above-described gland packing materials (1) of the invention, and bundling and braiding these gland packing materials (1) by a braiding machine. For example, the gland packing (5) shown in FIG. 33 is produced by conducting an eight-strand square-knitting process on eight gland packing materials (1).

In the gland packing (5), a plurality of above-described gland packing materials (1) are braided, properties which are requested in a packing, and which are preferable in sealing, such as the heat resistance, the compressibility, and the recovery property are provided by the strip-like expanded graphite, and a high shape-retaining property is provided by the reinforcing member (20). Therefore, the gland packing (5) in which a plurality of gland packing materials (1) are braided has excellent shape-retaining and sealing properties, and can satisfactorily seal a shaft seal part of a fluid apparatus.

Figure 34:
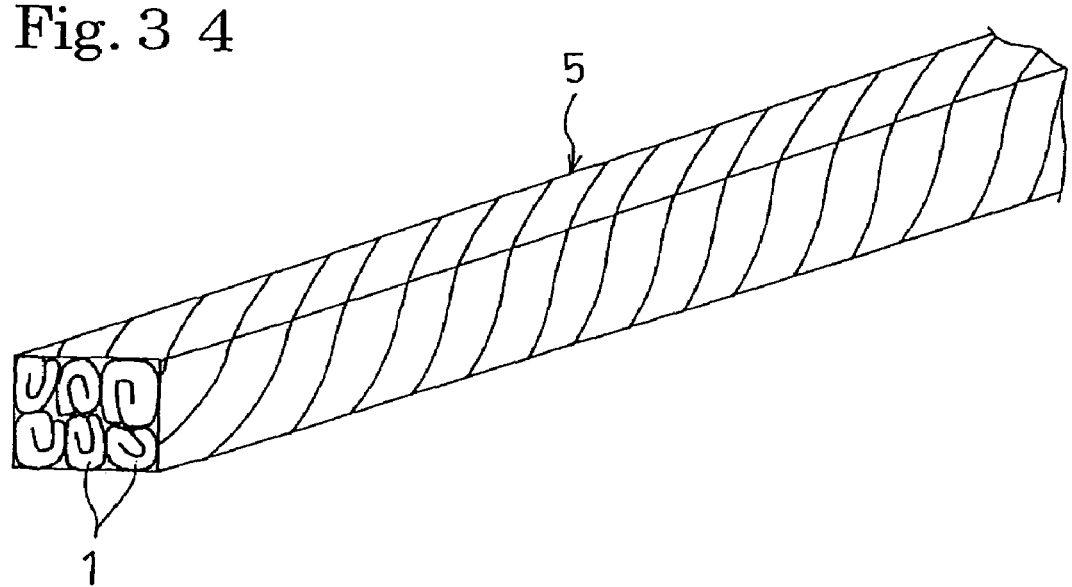
FIG. 34 is a perspective view showing another embodiment of the gland packing of the invention.
Figure 3:
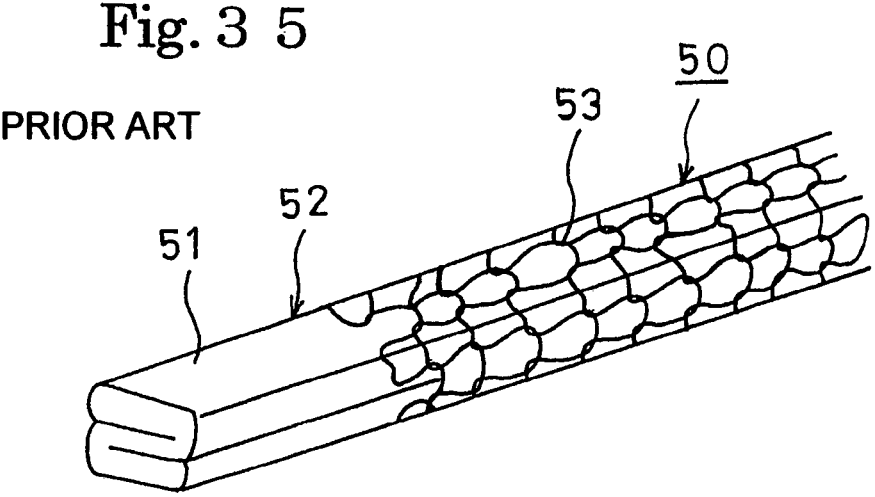
Figure 3:
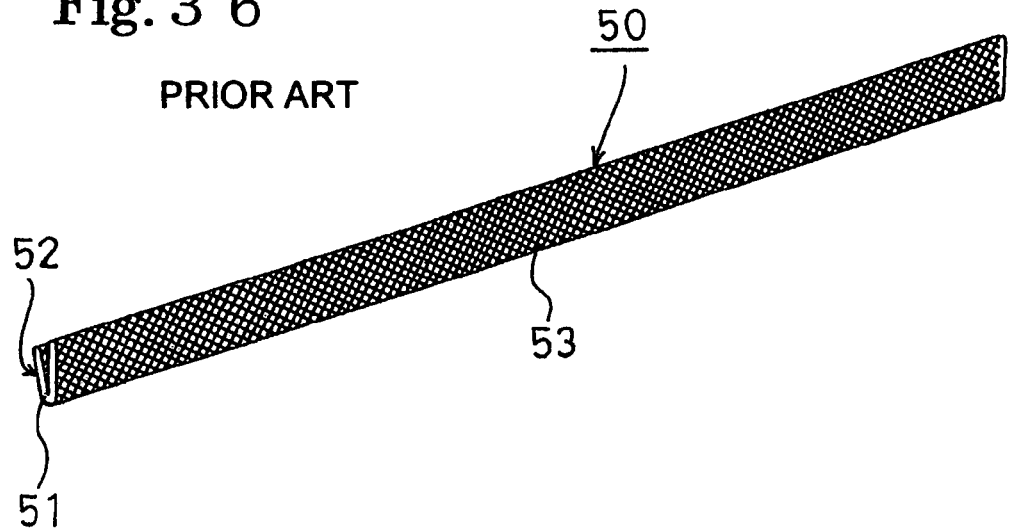
Figure 3:
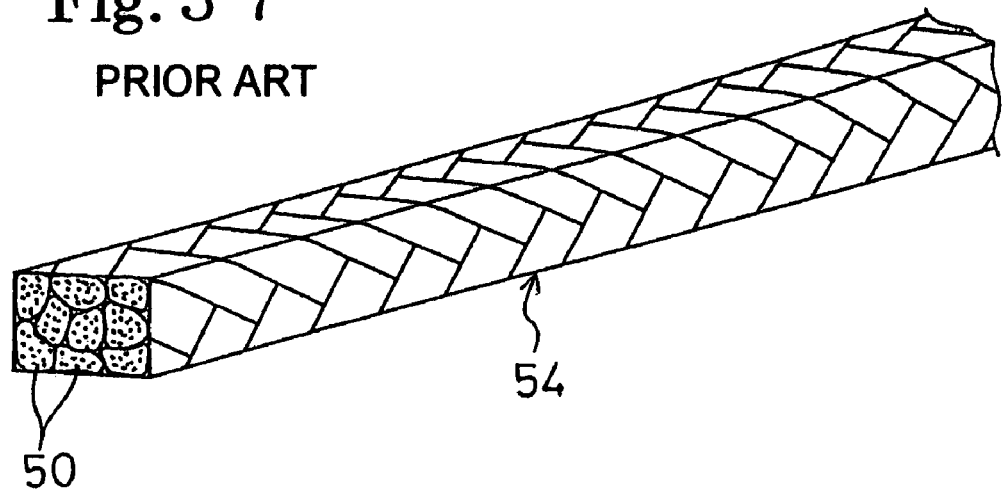
Figure 3:
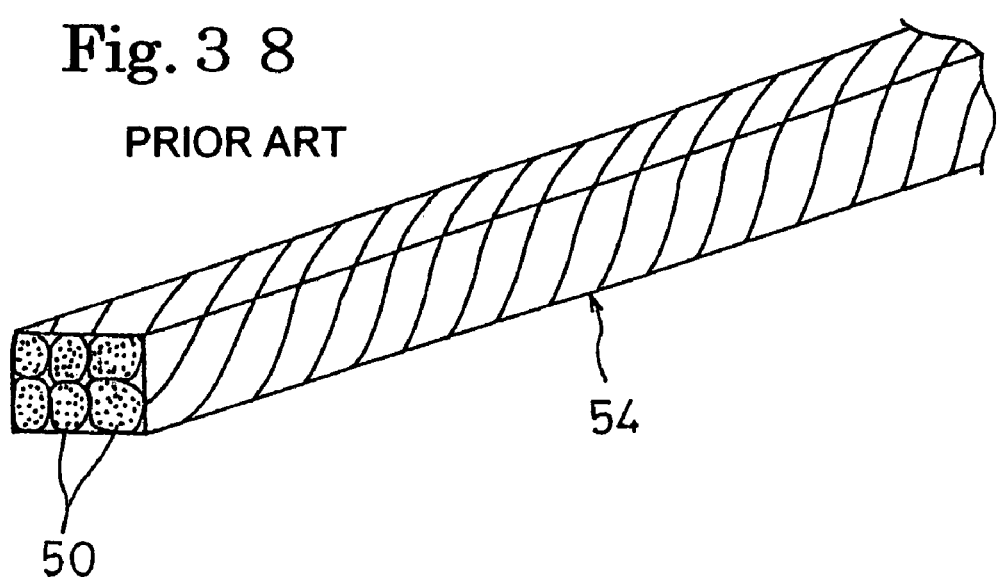
Figure 39:
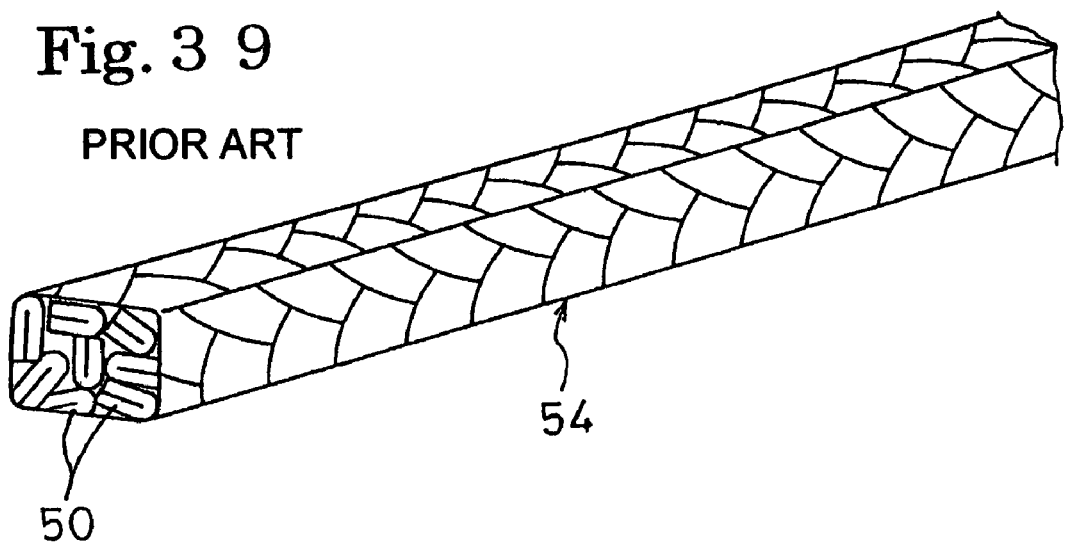
Figure 40:
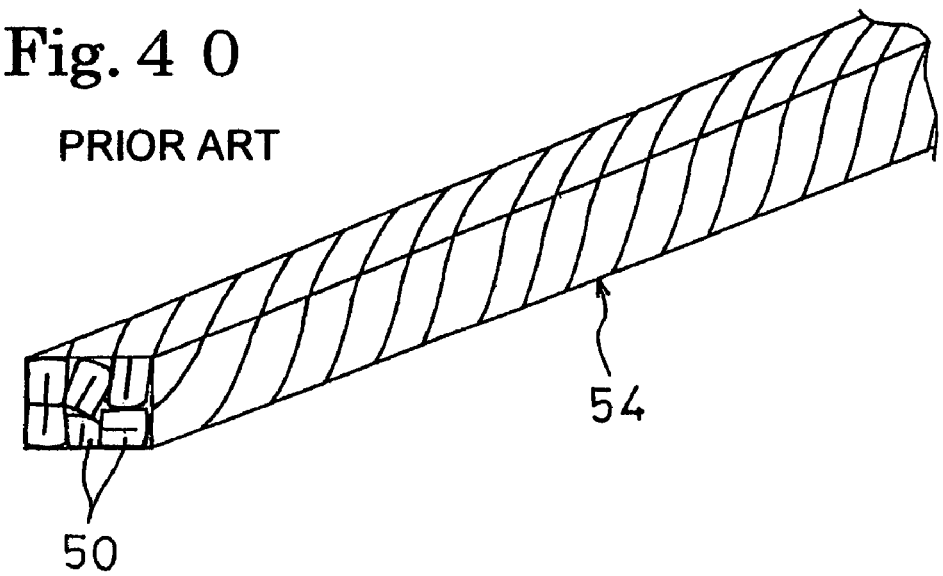
Figure 41:
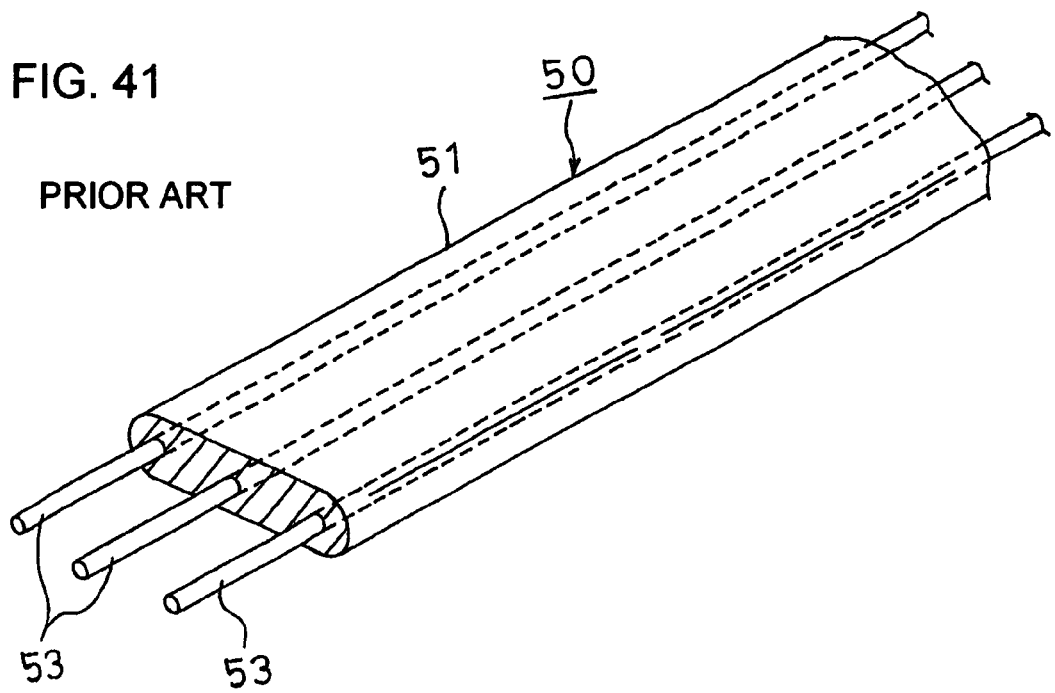

FIG. 34 is a perspective view showing another embodiment of the gland packing of the invention.

In the embodiment, the cord-like gland packing (5) is produced by, in place of braiding gland packing materials (1), bundling and twisting a plurality of above-described gland packing materials (1). For example, the gland packing (5) shown in FIG. 34 is formed by conducting a roll molding process while bundling and applying a twisting process on six gland packing materials (1).

The gland packing (5) of the embodiment functions and attains effects in a similar manner as the embodiment in which the gland packing materials (1) are braided. Therefore, its description is omitted.

The invention claimed is:

1. A gland packing material wherein said gland packing material comprises a cord member (40) which is formed by stranding a base strip member (4), or winding a base strip member (4) about a longitudinal direction; or winding a base strip member (4) about a longitudinal direction and then stranding said base strip member, said base strip member (4) comprises: a reinforcing member (20) comprised of a fibrous material (2); and an expanded graphite strip (3), said reinforcing member (20) is disposed at least on one face of said expanded graphite strip (3), and both said reinforcing member (20) and said expanded graphite strip (3) are placed on an outer peripheral surface of said cord member (40).

2. A gland packing material according to claim 1, wherein one side end edge of said base strip member (4) is placed on an outer peripheral surface of said cord member (40) in the side end edge, one member (4a) of said reinforcing member (20) and said expanded graphite strip (3) is more elongated in a width direction than another member (4b), and said one member (4a) which is elongated in the width direction is placed on an inner side, and said other member (4b) which is short in the width direction is placed on an outer side, said base strip member (4) is stranded after said base strip member is wound about the longitudinal direction, whereby said reinforcing member (20) and said expanded graphite strip (3) are placed in a spiral manner to be alternately arranged in an axial direction on the outer peripheral surface of said cord member (40).

3. A gland packing material according to claim 1, wherein said reinforcing member (20) is formed to be smaller in width than said expanded graphite strip (3), a plurality of said reinforcing members (20) are disposed at least on one face of said expanded graphite strip (3) with intervals formed therebetween in a width direction, and said smaller in width reinforcing members (20) are placed on an outer side, said base strip member (4) is stranded alter said base strip member is wound about the longitudinal direction, whereby said reinforcing members (20) and said expanded graphite strip (3) are wound in a spiral manner to be alternately arranged in an axial direction on the outer peripheral surface of said cord member (40).

4. A gland packing material according to claim 1, wherein said base strip member (4) is stranded after said base strip member is wound about the longitudinal direction in an intermediate portion in the width direction of said base strip member (4), thereby causing both side end edges of said base strip member (4) to be positioned on an outer peripheral surface of said cord member (40), in one of said side end edges, said reinforcing member (20) is placed on an outer side, and, in another side end edge, said expanded graphite strip (3) is placed on an outer side, whereby said reinforcing member (20) and said expanded graphite strip (3) are placed in a spiral manner to be alternately arranged in an axial direction on the outer peripheral surface of said card member (40).

5. A gland packing material according to claim 1, wherein said reinforcing member (20) is placed on the outer peripheral surface of said cord member (40), a large number of openings (20A) are formed in said reinforcing member (20), said expended graphite strip (3) enters said openings (20A), and is exposed from the outer peripheral surface of said cord member (40) through said openings (20A).

6. A gland packing material according to claim 1, wherein said reinforcing member (20) is disposed only on one face of said expanded graphite strip (3).

7. A gland packing material according to claim 1, wherein said reinforcing member (20) is disposed on both faces of said expanded graphite strip (3).

8. A gland packing material according to claim 1, wherein said fibrous material (2) is fanned into a sheet shape, and said fibrous material sheet comprises a fiber-opened sheet (2B) in which multifilament yarns are opened in a sheet shape.

9. A gland packing material according to claim 8, wherein a thickness of said fiber-opened sheet (2B) is set to 10 μm to 300 μm.

10. A gland packing material according to claim 1, wherein said fibrous material (2) comprises at least one selected from the group consisting of carbon fibers, brittle fibers, and tough fibers.

11. A gland packing material according to claim 10, wherein said brittle fibers comprise at least one selected from the group consisting of glass fibers, silica fibers, and ceramic fibers.

12. A gland packing material according to claim 10, wherein said tough fibers comprise at least one selected from the group consisting of metal fibers, aramid fibers, and PBO fibers.

13. A gland packing comprising braiding or winding together a plurality of gland packing materials (1) according to any one of claims 1 to 12.

* * * * *